US006931647B1

(12) United States Patent
Firth et al.

(10) Patent No.: US 6,931,647 B1
(45) Date of Patent: Aug. 16, 2005

(54) PROTOCOL AGNOSTIC WEB LISTENER

(75) Inventors: Richard L. Firth, Redmond, WA (US); Henrik Frystyk Nielsen, Seattle, WA (US); Lance E. Olson, Sammamish, WA (US); Henry L. Sanders, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 807 days.

(21) Appl. No.: 09/818,448

(22) Filed: Mar. 27, 2001

(51) Int. Cl.$^7$ .............................................. G06F 9/46
(52) U.S. Cl. ..................................... 719/332; 709/230
(58) Field of Search ................................ 709/200, 230, 709/203; 719/316, 332, 315

(56) References Cited

U.S. PATENT DOCUMENTS

| 5,796,393 | A | * | 8/1998 | MacNaughton et al. ..... 345/733 |
| 5,835,712 | A | * | 11/1998 | DuFresne ................... 709/203 |
| 6,061,659 | A | * | 5/2000 | Murray ........................ 705/14 |
| 6,408,298 | B1 | | 6/2002 | Van et al. |
| 6,493,749 | B2 | * | 12/2002 | Paxhia et al. ............... 709/220 |
| 2002/0161673 | A1 | * | 10/2002 | Lee et al. ..................... 705/27 |

OTHER PUBLICATIONS

Borisov, et al., "Intercepting Mobile Communications: The Insecurity of 802.11," ACM Sigmobile, 2001, p. 180-8.
Ortega-Binderberger, "Webmars: A Multimedia Search Engine for the World Wide Web," 1994.
Draft, Mar. 3, 1998, http://www.w3.org/TR/1998/WD-xlink-19980303, "XML Linking Language (XLink)".

* cited by examiner

Primary Examiner—Krisna Lim
(74) Attorney, Agent, or Firm—Amin & Turocy, LLP

(57) ABSTRACT

A system and method for facilitating exposing a resource over a protocol is provided. The system includes a class factory that holds identifiers associated with determining which, if any, registered listener object creator should be employed to create a listener object. The listener object implements an abstract network protocol base class. The listener object is employed to abstract details of exposing a resource over a protocol and to provide a byte stream interface to communications occurring over the protocol, while removing protocol specific code from a server program. The method includes creating an instance of a listener object from a source of registered protocol handlers based on a request to expose a resource over a protocol and using a base class API to communicate over the protocol through the listener object.

47 Claims, 14 Drawing Sheets

CLASS WEB_ANSWER

PROTOCOL AGNOSTIC WEB LISTENER

TECHNICAL FIELD

The present invention relates generally to computer programming and more particularly to simplifying exposing resources (e.g., applications, content and services) to applications accessing such resources over a network, by providing network objects operable to abstract protocol specific communication details.

BACKGROUND OF THE INVENTION

As more programs and users have become accustomed to seeking access to applications, services and content sources (hereinafter resources) available over networks, it has become more common for providers of such resources to expose and serve up (hereinafter "expose") their resources via a network. Conventionally, exposing resources requires employing a server program that consumes significant resources (e.g., processing cycles, disk, communication bandwidth). But some providers of resources may not require the comprehensive features provided by conventional servers and may not be able to afford the resources required by such "heavyweight" conventional servers. Thus, resources that could be made available over networks may not be made available, limiting the expansion and value of such networks.

Exposing resources over a network typically requires formatting communications in a protocol supported by the network. Such communication is typically handled by a server. For example, messages traversing the Internet can be formatted in protocols including, but not limited to, Hypertext Transfer Protocol (HTTP), File Transfer Protocol (FTP) and Simple Mail Transport Protocol (SMTP). Such a diversity of protocols facilitates communication between a wide range of devices, applications and/or processes in a variety of methods. But such diversity leads to problems for server programmers trying to expose resources through different networks and by different protocols to facilitate wide accessibility.

Conventionally, a server program written to expose resources provided over a network includes code specific to the protocol employed to transport messages across the network. For example, a programmer writing a peer-to-peer application for exposing files that can be shared across a network includes code specific to the protocol existing between the peer processes. By way of illustration, a file-sharing program may have to include HTTP specific code. Including such protocol specific code in a server program can negatively impact writing such a server program by requiring the programmer(s) involved in writing the server program to learn details of the protocol. Learning such details, and coding such protocol specific details can increase program complexity while reducing program flexibility.

Program flexibility can be important to programs exposing resources. For example, protocols change, and thus an inflexible program that cannot adapt to such changes will have restricted utility and shortened lifespan. By way of illustration, a program written to communicate specifically via HTTP 1.0 may not be able to communicate via HTTP 1.1. Thus, the server program may need to be rewritten and recompiled to take advantage of the newer protocol. By way of further illustration, peer-to-peer communications are characterized by dynamically formed ad hoc networks. Such dynamic ad hoc networks require servers capable of being protocol and URI agile. Server programs relying solely on protocol and URI specific code cannot provide the desired agility.

The dynamic ad hoc networks prevalent in peer-to-peer communications are typically established between peers with limited resources. For example, a college student with a personal computer may desire to establish a peer-to-peer network with his family and friends to share files. His family and friends may similarly only have available a set of small computers to engage in the desired communications. Conventionally, a server program written to expose resources provided over a network required large amounts of computer resources (e.g., processing cycles, disk space, network bandwidth) and thus the college student and his peers may not be able to establish the desired communications. Servers that require such large amounts of computer resources can be referred to as "heavyweight" servers. Heavyweight servers, therefore, can limit the ability to form ad hoc networks, and thus limit desired communications between peers.

Programmers writing server programs to expose resources addressable by a URI (Uniform Resource Identifier) typically are required to know the URI, to leave the resource at the known URI, to know the protocol employed to access the URI and to write code specific to the protocol required to access that URI. Thus, changing the URI of an application, service and/or content source could require a server program to be rewritten and recompiled, thus restricting the ability to move content from one location to another and introducing opportunities to introduce new bugs into a system when such relocation is attempted. Further, user written server programs conventionally are prevented from sharing a protocol (e.g., HTTP) namespace with a commercially provided server unless the user written server program can co-exist with (often by being dominated by) the commercial server. Further still, user written servers tend to consume the entire namespace on the machine on which they run, restricting a machine to running one server. But it can be advantageous to have a machine expose a plurality of smaller, less resource intensive resources (e.g., content source of a single page of data, a simple ZIP code lookup application, a simple file sharing service) through a plurality of small servers.

Programmers are further constrained by conventional systems and methods to transmit and receive messages in message sizes and formats dictated by a protocol. For example, a server exposing email content may be required to listen for requests for email where the requests are formatted as a packet with a header and trailer according to a first protocol. Similarly, a server exposing an encyclopedia may be required to listen for HTTP get requests consisting of a few words formatted according to a second protocol. Such protocol specific packaging and size restrictions add complexity to server programs and limit the ability of one server to expose multiple resources over a variety of protocols.

Thus a system and/or method for enabling server applications to expose resources and to communicate simply over a plurality of protocols is still needed to mitigate problems associated with conventional systems.

SUMMARY

The following presents a simplified summary of the invention in order to provide a basic understanding of some aspects of the invention. This summary is not an extensive overview of the invention. It is not intended to identify key or critical elements of the invention or to delineate the scope of the invention. Its sole purpose is to present some concepts of the invention in a simplified form as a prelude to the more detailed description that is presented later.

The present invention provides a system and method for a server program to expose and serve up (hereinafter "expose") applications, services and content sources (hereinafter "resources") at one or more URIs and to communicate over a variety of protocols without having to rewrite and recompile the server program when interacting with different protocols or when exposing different resources. The system further facilitates a server program interacting with a new protocol without having to rewrite and recompile the server program. The system facilitates making messages sent and received over a network appear to be a simple byte stream. Such a byte stream can be read and/or written by a server program without protocol specific sizing and/or packaging details, thus mitigating sizing problems associated with conventional systems. The system facilitates providing a server that requires fewer resources than a conventional "heavyweight" server that attempts to perform substantially all functions related to one or more protocols, and can thus be referred to as a "lightweight" server. The system facilitates multiple server programs operating concurrently on one computer.

The system includes a class factory that houses identifiers and associated registered listener object creators. The identifiers can be, but are not limited to being, registered URIs and/or URI prefixes. When a server programmer desires to write a server application that will expose resources addressable by an identifier, the server programmer will be able to request that the class factory provide a listener object suitable for communicating over the protocol(s) by which the resources can be accessed. The server programmer will not be required to learn details associated with communicating by the protocol(s) employed by accessing applications to communicate with the resources. Thus, complexity problems associated with conventional systems are mitigated.

If a suitable listener object has been registered with the class factory, then the class factory will return a listener object capable of communicating over that protocol. The listener object can make messages received over the protocol appear as a continuous byte stream to the programmer. Further, the listener object facilitates sending messages by writing to a continuous byte stream. Thus, problems associated with sizing are mitigated.

The system includes a listener object registration system that facilitates making new listener objects available to server applications. When such listener objects become available, they can be registered with the class factory. Such registration makes the listener object available to the server program without requiring server program rewriting or recompiling. Thus, problems associated with program flexibility and adaptability are mitigated. Such registration, and subsequent availability to user written server programs facilitates having multiple server programs operate concurrently on one computer. For example, a first server program may access a registered listener object operable to communicate via a first protocol, while a second server program may access a second and a third registered listener object to communicate via a second and third protocol.

The present invention also provides a method for allowing a server program to expose resources over different protocols. The method includes registering protocol handlers with a listener object generating process. The method includes accepting a request from an application seeking to expose resources. The method accepts the request and the listener object generating process creates an instance of a listener object from the registered protocol handlers. For example, if the application seeks to expose resources accessible via HTTP, the method can return a listener object capable of processing HTTP requests and responses. Such requests may be represented by a WebRequest object, for example. The listener object would be further operable to treat such requests (e.g., as represented by WebRequest objects) and responses as a byte stream. The server program can then communicate with the entities accessing the exposed resources through the listener object by employing methods available through a base class API.

The present invention may also provide separate analogous objects, processes and methods for returning the content requested by an accessing application, where such request was received via the listener object, to the accessing application, in lieu of employing the listener object to both receive and return information.

To the accomplishment of the foregoing and related ends, certain illustrative aspects of the invention are described herein in connection with the following description and the annexed drawings. These aspects are indicative of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
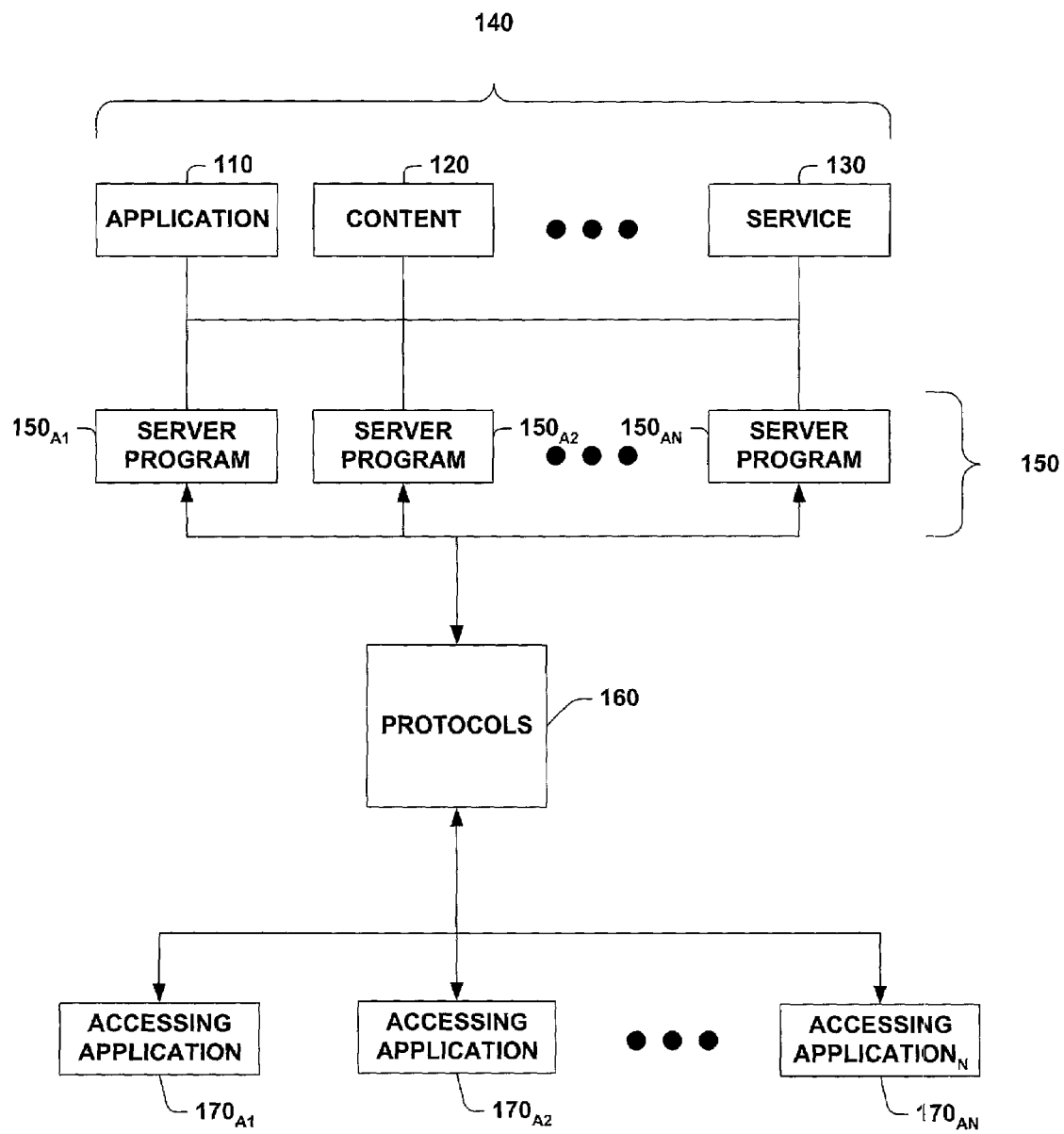
FIG. 1 is a block diagram illustrating a plurality of server programs exposing resources (e.g., applications, content and services) to a plurality of accessing applications via a plurality of protocols, in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident to one skilled in the art that the present invention may be practiced without these specific details. In other instances, well-known structures and devices are shown in block diagram form in order to facilitate description of the present invention.

The term "component" refers to a computer-related entity, either hardware, a combination of hardware and software, software, or software in execution. For example, a component may be a process running on a processor, a processor, an object, an executable, a thread of execution, a program and a computer. By way of illustration, both an application running on a server and the server can be components.

The term "class factory" refers to a computer-related entity, either hardware, a combination of hardware and software, software, or software in execution. For example, a class factory may be a process running on a processor, a processor, an object, an executable, a thread of execution, a program and a computer. By way of illustration, both an application running on a server and the server can be class factories.

The term "creator" refers to a computer-related entity, either hardware, a combination of hardware and software, software, or software in execution. For example, a creator may be a process running on a processor, a processor, an object, an executable, a thread of execution, a program and a computer. By way of illustration, both an application running on a server and the server can be creators.

The term "constructor" refers to a computer-related entity, either hardware, a combination of hardware and software, software, or software in execution. For example, a constructor may be a process running on a processor, a processor, an object, an executable, a thread of execution, a program and a computer. By way of illustration, both an application running on a server and the server can be constructors.

It is to be appreciated that various aspects of the present invention may employ technologies associated with facilitating unconstrained optimization and/or minimization of error costs. Thus, non-linear training systems/methodologies (e.g., back propagation, Bayesian, fuzzy sets, non-linear regression, or other neural networking paradigms including mixture of experts, cerebella model arithmetic computer (CMACS), radial basis functions, directed search networks and function link networks) may be employed.

Referring initially to FIG. 1, server programs $150_{A1}$, and $150_{A2}$ through $150_{AN}$, N being an integer, (collectively the server programs 150) are illustrated exposing an application 110, a content 120 and a service 130 (collectively the resources 140) to a accessing applications $170_{A1}$, and $170_{A2}$ through $170_{AN}$, N being an integer, (collectively the accessing applications 170), via one or more protocols 160. Exposing the resources 140 involves making the resources 140 available to the accessing applications 170. Conventionally, a server program $150_{A1}$, desiring to expose the resources 140 is required to include code specific to the protocol(s) 160 by which the server program $150_{A1}$ and the accessing applications 170 will communicate. For example, a first server program $150_{A1}$ desiring to expose a Hypertext Markup Language (HTML) Web page can be required to include code specific to the Hypertext Transfer Protocol (HTTP). Similarly, a second server program $150_{A2}$ desiring to expose an FTP resource may be required to include code specific to the File Transfer Protocol. Embedding such protocol specific code in a server program increases server program complexity while reducing server program flexibility. Thus, the present invention facilitates writing a server program to expose the resources 140 while remaining abstracted from the details of the protocol(s) 160.

Although the server programs 150 and the accessing applications 170 are illustrated as separate entities, it is to be appreciated by one skilled in the art that a computer may host both a server program 150 and an accessing application 170. It is to be further appreciated that although the first server program $150_{A1}$, the second server program $150_{A2}$ and the Nth server program $150_{AN}$ are illustrated as separate entities, that a single computer may host more than one server program 150, with such server programs operating concurrently.

Figure 2:
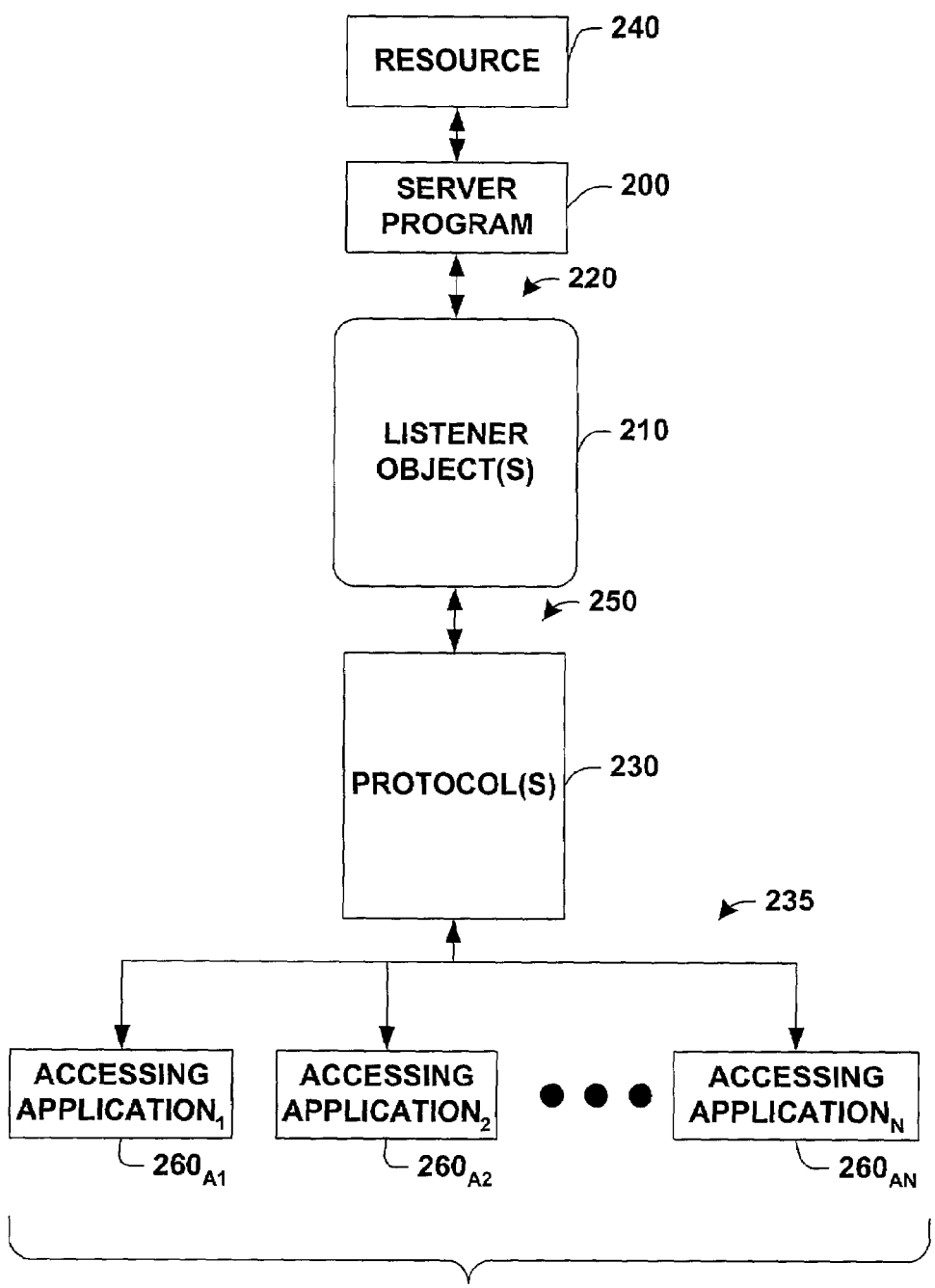
FIG. 2 is a block diagram illustrating a server program employing protocol objects to expose resources via a plurality of protocols, in accordance with an aspect of the present invention.

FIG. 2 is illustrates a server program 200 employing one or more listener objects 210 to expose a resource 240 to a plurality of accessing applications 260 via one or more protocols 230. The listener objects 210 and the accessing applications 260 may communicate, for example, through one or more communications networks 235. The server program 200 can communicate with the listener object 210 via a byte stream 220. The listener object 210, however, can communicate with the accessing applications 260 via a data stream 250, where data flowing in the data stream 250 is formatted in accordance with one or more protocols 230. Although one server program 200 is illustrated, it is to be appreciated by one skilled in the art that a greater number of server programs 200 may be employed in accordance with the present invention. Similarly, while one listener object 210 is illustrated, it is to be appreciated that a greater number of listener objects 210 can be employed. It is to be further appreciated that although one resource 240 is illustrated, that a server program 200 can expose more than resources 240, via one or more protocols 230 and that one resource 240 can be exposed by more than one server program 200.

Conventionally, the server program 200 would be required to format data intended for a first accessing application $260_{A1}$ in a manner consistent with a first protocol 230 through which the resource 240 was exposed by including protocol specific code. By way of illustration, if a first resource 240 was an HTML page, the server program 200 could be required to include code specific to an HTTP protocol. By way of further illustration, if a second resource 240 was an FTP data source, then the server program 200 could be required to include code specific to an FTP protocol to expose the resource 240 a second accessing application 260$_{A2}$. Including such protocol specific code in the server program 200 can increase the server program 200 complexity and cost. Furthermore, including such protocol specific code in the server program 200 can limit the flexibility and thus shorten the lifespan of the server program 200. Conventionally, if the server program 200 desired to expose more than one resource 240 via more than one protocol, then the server program 200 could be required to include code specific to each of the protocols with which it would interact, thus increasing the server program 200 size and complexity.

The present invention thus provides a listener object 210 that mitigates problems associated with requiring the inclusion of protocol specific code in the server program 200. The listener object 210 facilitates establishing a data communications channel, exposing the resource 240 and receiving requests. Such requests may be represented, for example, in a WebRequest object that facilitates treating requests in a generic manner. By way of illustration, if the resource 240 was an HTML page, the server program 200 would not be required to include code specific to an HTTP protocol, rather the server program 200 would communicate via a first byte stream 220 with a first listener object 210. The first listener object 210 would include the protocol specific code that facilitates exposing the resource 240 via the HTTP protocol. Thus, if a first accessing application 260$_{A1}$ made a request for content exposed in the resources 240, the listener object 210 could receive such a request (represented, for example, in a WebRequest object), parse the request, and provide the content of the request to the server application 200 as a byte stream. By way of further illustration, if the resource 240 was an FTP data source, then the server program 200 would not be required to include code specific to an FTP protocol. Rather, the server program 200 would expose the resource 240 via a second byte stream 220 with a second listener object 210. The second listener object 210 would include the protocol specific code that facilitates exposing the resource 240 via the FTP protocol. Thus, if a second accessing application 260$_{A2}$ made a request for content exposed in the resource 240, the listener object 210 could receive such a request, parse the request, and provide the content of the request to the server application 200 as a byte stream. The listener object 210 could convert the byte stream 220 to a format consistent with the protocol by which the desired resource 240 is accessed. For example, a first protocol object 210 could convert a first byte stream 220 associated with a first accessing application 260$_{A1}$ into data consistent with an HTTP protocol while a second listener object 210 could convert a second byte stream 220 associated with a second accessing application 260$_{A2}$ into data consistent with an FTP protocol.

The present invention thus mitigates complexity and inflexibility problems associated with conventional systems by providing listener objects 210 that can receive requests represented, for example, by WebRequest objects and remove code associated with the protocol specific details from the server program 200, making exposing the resource 240 possible via a byte stream 220. The present invention thus simplifies writing server programs 200 that expose one or more resources 240 to one or more accessing applications 260 via one or more protocols 230. Thus, writing server programs 200 that can accept requests from a first accessing application 260$_{A1}$ via a first protocol 230 and that can then write data related to such requests to a second accessing application 260$_{A2}$ via a second protocol is simplified. Furthermore, writing server programs 200 that expose resources 240 that are mobile (e.g., which can change URI) without requiring the server program 200 to be recompiled is simplified. By way of illustration, a server program 200 may expose a resource 240 locatable via a first URI through a first protocol but then the resource 240 may change its URI. Conventionally, the server program 200 may be required to add additional code to deal with a new protocol through which the resource 240 would be exposed. Including such additional code could require recompiling the server program 200. But the present invention can accept, by way of illustration, a URI as an identifier to determine which of a plurality of listener objects to employ to facilitate exposing a resource 240. Thus, no additional code needs to be added to the server program 200 to facilitate dealing with the different protocol and thus no recompilation is required.

By way of illustration of the decrease in complexity possible through the present invention, the following code fragment illustrates one possible method for a server program 200 to create a listener object 210, the listener object 210 interacting with requests represented as WebRequest objects, for example, and the listener object 210 including the code specific to a protocol and operable to provide the server program 200 with a byte stream.

1. WebListener WL=WebListenerClassFactory.create (protocol1);
2. WL.AddURIPrefix(Resources_name);
3. WebRequest WR=WL.GetRequest( );

Line 1 creates a web listener object for listening over the protocol specified by the variable protocol1. The variable protocol1 may have been populated, for example, by a command line argument, from a field read from a file, or by an interactive method (e.g., data acquired by an Active Server Page). The argument protocol1 can be, for example, a registered index. The create method is employed to invoke a listener object constructor based, at least in part, on the value of the argument protocol1.

Line 2 creates a URI identifying an address at which the resource is exposed. For example, if the value of protocol1 were "http" and the value of Resources_name were mymoney, and lines 1 and 2 were invoked from a computer named ServerX1, then the URI http://ServerX1/mymoney would be created in the server's name space, and accessing applications would be able to access the content of mymoney exposed at the URI.

Line 3 starts the listening process for the listener object created in line 1. Requests received through the listening process can be stored in the WebRequest object WR created in line 3. Thus, requests received through the listener object created in line 1 are parsed and placed into a byte stream that is available to the server program that include lines 1, 2 and 3.

Thus, lines 1, 2 and 3 illustrate one example of server program 200 creation that does not require protocol specific code, and which is thus relatively simple and flexible as compared to conventional systems.

Figure 3:
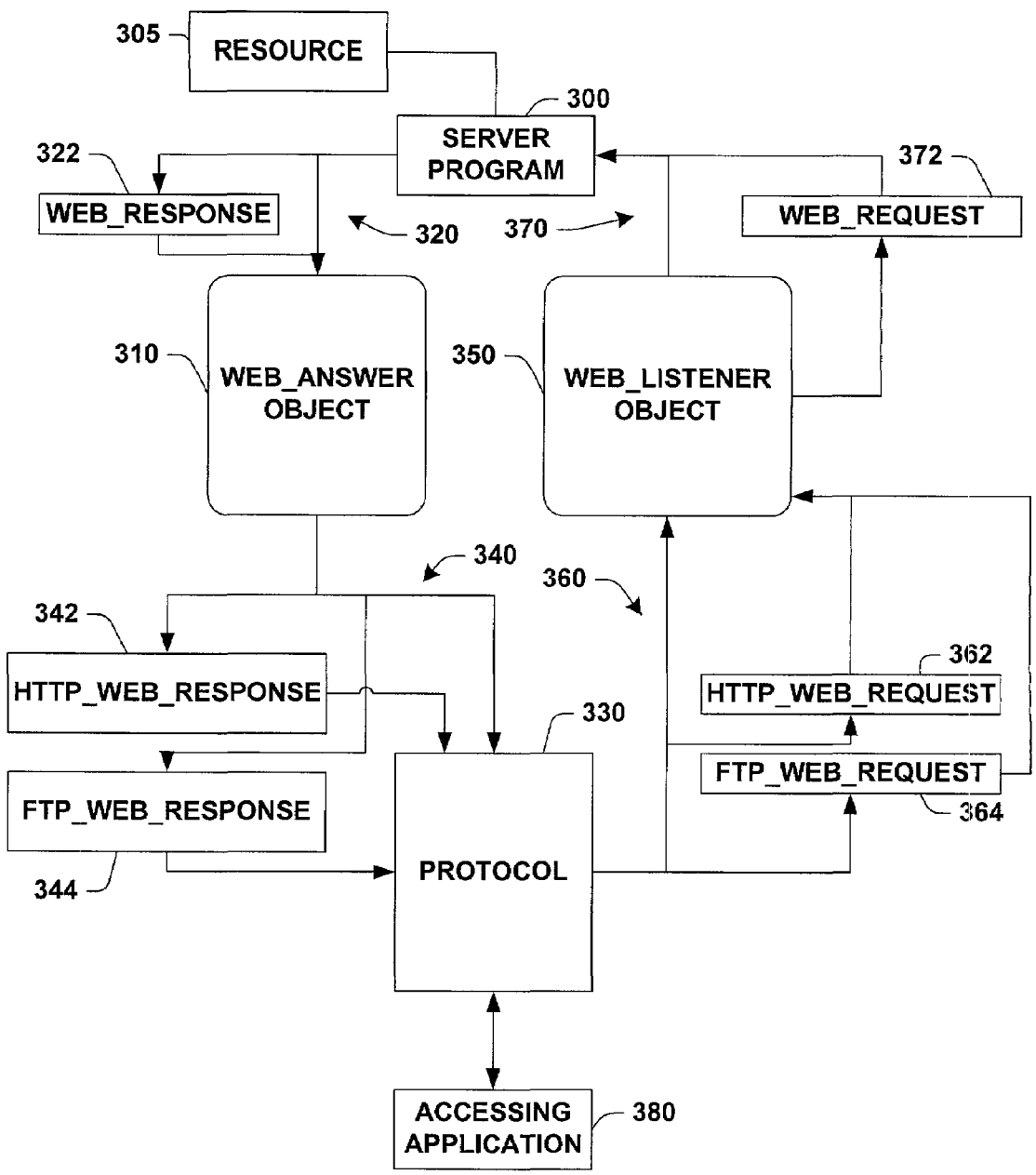
FIG. 3 is a block diagram illustrating a server program employing a listener object and an answering object to expose resources via a protocol, in accordance with an aspect of the present invention.

Turning now to FIG. 3, a schematic block diagram illustrates a server program 300 employing a listener object 350 and an answering object 310 to expose a resource 305 via a protocol 330 to an accessing application 380. Although the answering object 310 and the listener object 350 are illustrated as two separate objects, it is to be appreciated by one skilled in the art that the listening and answering functionality may be accomplished in a greater or lesser number of separate, combined, and/or distributed objects. It is to be further appreciated that although a listener object 350 is illustrated, a reading component may perform the listening functionality. Any suitable reading component may be employed in accordance with the present invention. Similarly, it is to be further appreciated that although an answering object 310 is illustrated, a writing component may perform the answering functionality. Any suitable writing component may be employed in accordance with the present invention. It is to be further appreciated that although a server program 300 is illustrated, an exposing component may be employed to expose the resource 300 to the accessing application 380 through the listener object 350 and/or the answering object 310.

The answering object 310 may be, for example, a WEB_ANSWER object, which accepts a byte stream 320 of data related to a request generated by the accessing application 380 and produces a data 340 consistent with the protocol 330. The answering object 310 may also accept a generic WebResponse object 322 and produce protocol specific objects including, but not limited to, HttpWebResponse objects 342 and Ftp WebResponse objects 344. The protocol specific code required to provide such functionality is removed from the server program 300, which leads to reduced server program 300 complexity and increased server program 300 flexibility. The listener object 350 may be, for example, a WEB_LISTENER object, which produces a byte stream 370 from a data 360 associated with a request generated by the accessing application 380, the data 360 being formatted consistently with the protocol 330. The listening object 350 may also accept protocol specific objects including, but not limited to, Http WebRequest objects 362 and Ftp WebRequest objects 364 and produce a generic WebRequest object 372. The protocol specific code required to provide such functionality is removed from the server program 300, which leads to reduced server program 300 complexity and increased server program 300 flexibility. The answering object 310 and the listener object 350 can thus make the accessing application 380 appear as a pair of byte streams and/or as a series of generic, protocol-free request and response objects to the server program 300, simplifying the process of writing the server program 300. Although a WEB_ANSWER object and a WEB_LISTENER object are illustrated as examples of the answering object 310 and the listener object 350, it is to be appreciated by one skilled in the art that any appropriate listening and/or answering objects can be employed in accordance with the present invention.

Due, at least in part, to the functionality provided by the listener object 350 and/or the answering object 310, the server program 300 is not required to include code specific to the protocol 330, but rather the server program 300 includes code that can be employed to generate the creation of the listener object 350 and/or the answering object 310. Such generating code can be employed to create objects that can be employed to expose a resource 305 to a plurality of accessing applications 380 via a plurality of protocols 330. Furthermore, such generating code can be responsive to parameters input to the server program 300, allowing the server program 300 to be flexible and avoid recoding and recompilations. The input parameters may, for example, be associated with identifiers stored in a class factory (e.g., 520, FIG. 5) employed to select a listener object creator operable to create the listener object 350 and/or the answering object 310. Thus, with input parameters available to be passed through to a class factory callable by generic program code, the server program 300 can be isolated from protocol specific details, increasing flexibility and lifespan over conventional systems. The server program 300 may invoke such generating code one or more times, as needed, to concurrently expose one or more resources 305 via one or more protocols 330 to one or more accessing applications 380. Thus, complexity and program size problems associated with conventional systems are mitigated.

Figure 4:
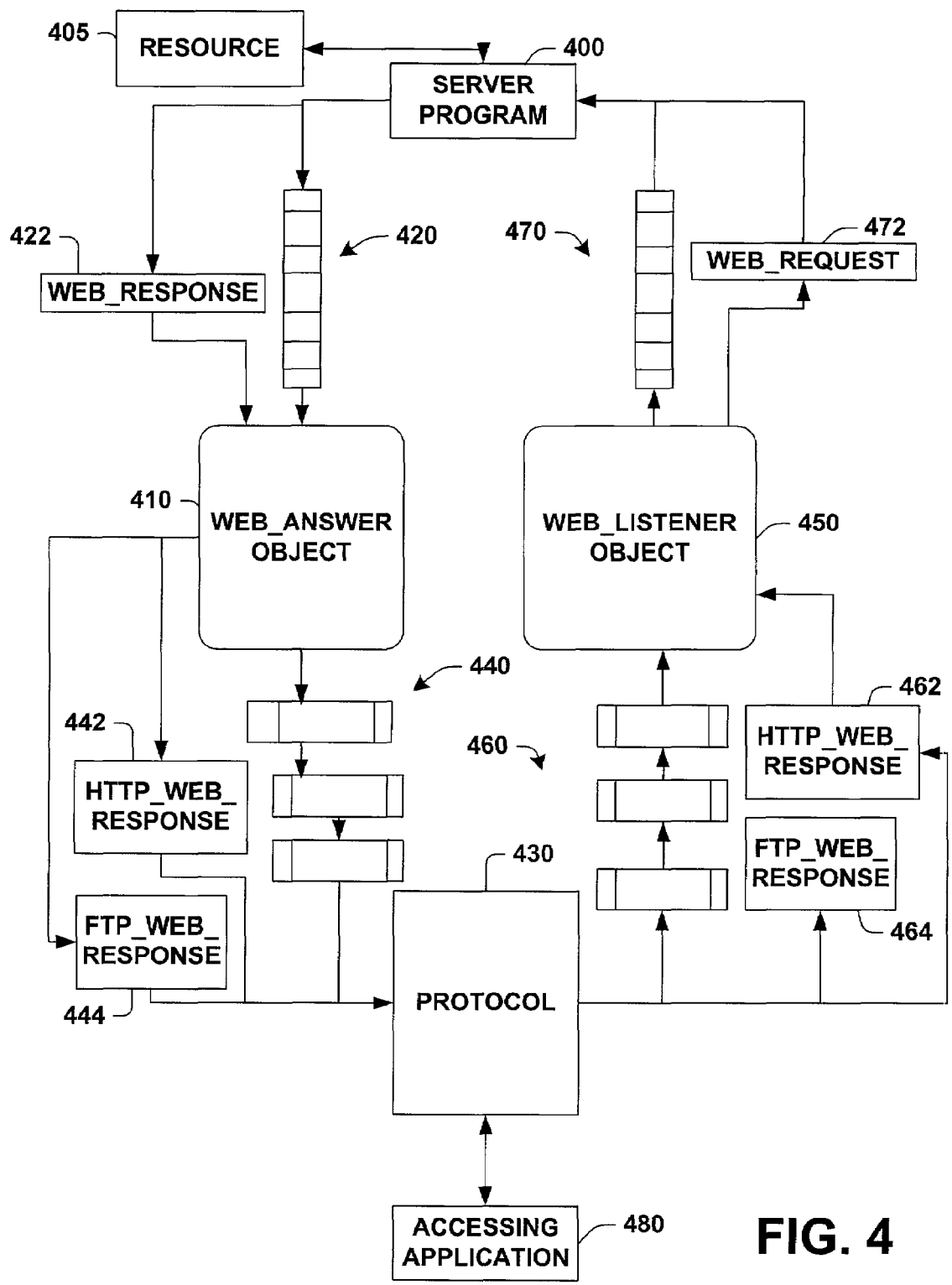
FIG. 4 is a block diagram illustrating a server program employing a listener object and an answering object to expose resources via a protocol, the access being accomplished via a byte stream, in accordance with an aspect of the present invention.

FIG. 4 illustrates a server program 400 employing a listener object 450 and an answering object 410 to expose a resource 405 to an accessing application 480 via a protocol 430, the exposure being facilitated by an outgoing byte stream 420 and an incoming byte stream 470. Although the answering object 410 and the listener object 450 are illustrated as two separate objects, it is to be appreciated by one skilled in the art that the listening and answering functionality may be accomplished in one object (e.g., a WEB_LISTENER object). Similarly, a greater or lesser number of separate, combined, and/or distributed objects can provide the listening and/or answering functioning illustrated in FIG. 4. For example, a listener object 450 may include the answering functionality of the answering object 410. The server program 400 can thus expose the resource 405 and communicate with the accessing application 480 through relatively simple read and write methods provided by the listener object 450 and the answering object 410, rather than by relatively complicated protocol specific calls. Such write methods can be employed to place one or more pieces of data in the outgoing byte stream 420, which is handled by the answering object 410. The answering object 410 can be, for example, a WEB_ANSWER object. The answering object 410 can take the byte stream 420 and produce, by way of illustration, one or more packets 440 formatted according to the protocol 430. The answering object 410 may accept one or more generic WebResponse objects 422 and produce protocol specific objects including, but not limited to, HttpWebResponse objects 442 and Ftp WebResponse objects 444. Thus, code required to perform processing associated with producing such packets 440 is not included in the server program 400 but rather is included in the answering object 410, with such code, and its functionality being accessible to the server program 400 through the answering object 410. Similarly, the listener object 450 can be, for example, a WEB_LISTENER object. The listener object 450 can accept, for example, one or more packets 460 of data formatted according to the protocol 430 and produce the byte stream 470. The listening object 450 may also accept one or more protocol specific objects including, but not limited to, Http WebRequest objects 462 and Ftp WebRequest objects 464 and produce a generic WebRequest object 472. Although packets 440 and 460 are illustrated, it is to be appreciated by one skilled in the art that other data formats, including, but not limited to, aggregations, collections, packets and datagrams may be processed by the answering object 410 and the listener object 450. The data packets 440 and/or 460 may include one or more headers and/or footers and/or formatting characters required by the protocol 430. The listener object 450 may remove the one or more headers, footers and/or formatting characters associated with the protocol from the packets 460 to produce the byte stream 470. Similarly, the answering object 410 may add such headers, footers and/or formatting characters associated with the protocol 430 to the byte stream 420 to produce the packets 440.

While the server program 400 is illustrated interacting with one outgoing byte stream 420 and one incoming byte stream 470, it is to be appreciated by one skilled in the art that the server program 400 may concurrently expose one or more resources 405 by one or more protocols 430 to one or more accessing applications 480, and therefore more than one outgoing byte stream 420 may be associated with the server program 400 and more than one incoming byte stream 470 may be associated with the server program 400. Similarly, more than one answering object 410 may be associated with the server program 400 and more than one listener object 450 may be associated with the server program 400.

It is to be further appreciated that although one server program 400 is illustrated, that more than one server program 400 may reside on a computer. Removing protocol specific code from the server program 400 and depositing it in protocol specific objects, which objects may run on the same computer as the server program 400, or which objects may run on one or more computers separate from the computer whereon the server program 400 runs facilitates reducing the size of the server program 400. Furthermore, removing the protocol specific code to the protocol specific objects facilitates simplifying the server program 400, which in turns facilitates having multiple server programs 400 reside on one computer. By allowing multiple server programs 400 to reside on one computer, server exclusivity problems associated with conventional systems are mitigated and the creation of ad hoc peer-to-peer networks is facilitated.

Figure 5:
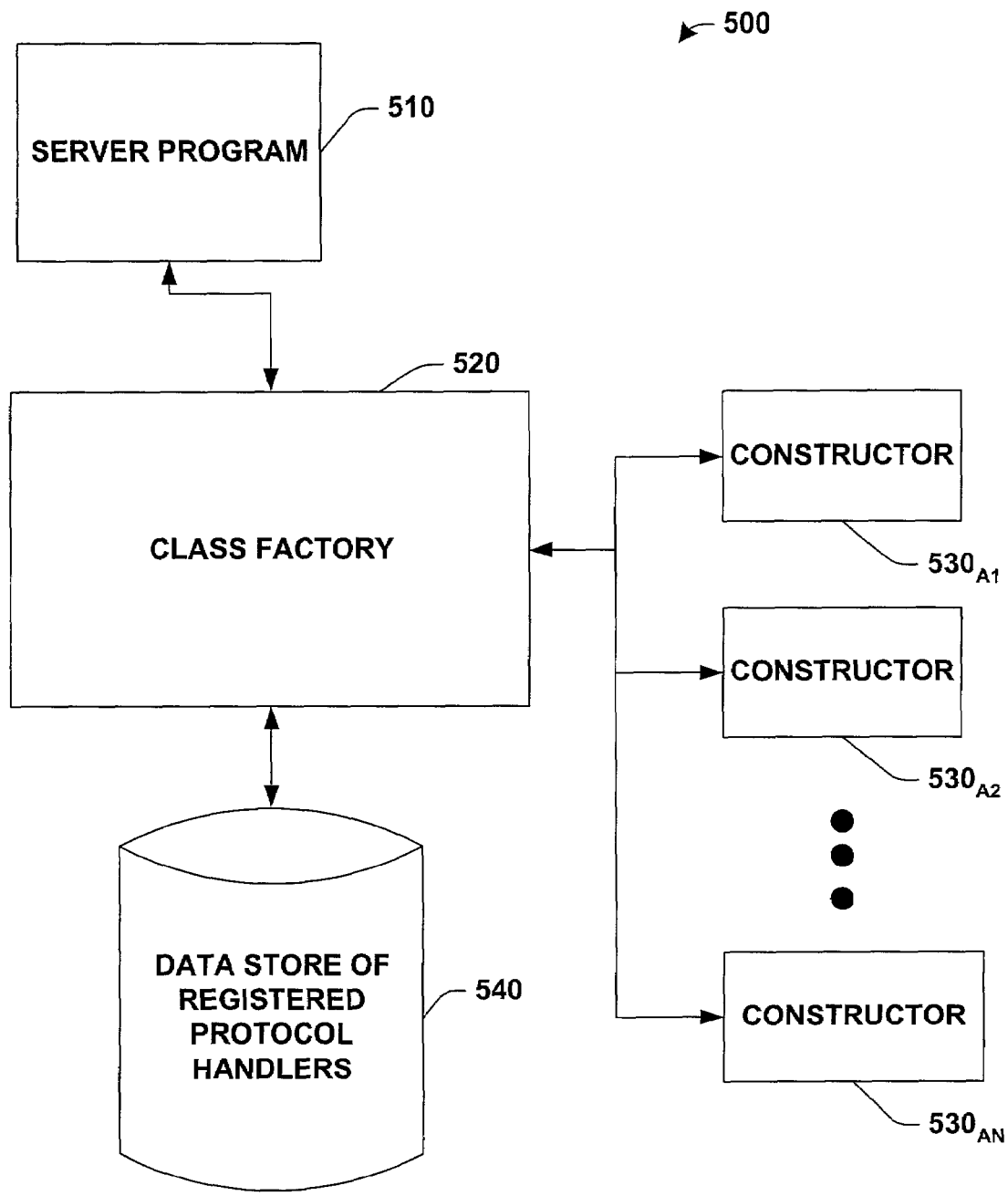
FIG. 5 is a block diagram illustrating a class factory accessing a data store of registered protocol handlers to determine which, if any, constructor to employ to create a protocol object to be used by a server program, in accordance with an aspect of the present invention.

Referring now to FIG. 5, a system 500 for facilitating a server program 510 exposing one or more resources (e.g., 405, FIG. 4) to one or more accessing applications (e.g., 480, FIG. 4) over one or more protocols (e.g., 430, FIG. 4) is illustrated. The system 500 includes a class factory 520 that has access to a first constructor $530_{A1}$, and a second constructor $530_{A2}$ through an Nth constructor $530_{AN}$, N being an integer. The constructors $530_{A1}$, $530_{A2}$ through $530_{AN}$ can be referred to collectively as the constructors 530. The first constructor $530_{A1}$ may be operable to produce listener and/or answering objects that facilitate exposing a resource (e.g., 405, FIG. 4) via a first protocol (e.g., HTTP) while the second constructor $530_{A2}$ may be operable to produce listener and/or answering objects that facilitate exposing a resource (e.g., 405, FIG. 4) via a second protocol (e.g., FTP). To expose a resource (e.g., 405, FIG. 4) to one or more accessing applications (e.g., 480, FIG. 4) via a protocol (e.g., 430, FIG. 4) the server program 510 can first request that a listener object be created by the class factory 520. The class factory 520 can select an appropriate constructor to employ to construct such a listener object based on an identifier associated with the resource (e.g., 405, FIG. 4) that the server program 510 seeks to expose. By way of illustration, if the server program 510 seeks to expose a resource identified by the URI http://ServerX1/mymoney then the class factory 520 may employ a constructor to produce a listener object operable to interact with the HTTP protocol. By way of further illustration, if the server program 510 seeks to expose a resource identified by the URI ftp://ServerX1/yourmoney then the class factory 520 may employ a different constructor to produce a listener object operable to interact with the FTP protocol.

Thus, in the example presented, the server program 510 may supply a URI to the class factory 520. The URI can be an input to the server program 510 (e.g., a command line parameter, a field read from a file, a string input by a user) that is employed by the code that invokes the operations of the class factory 520. Thus, the server program 510 can be substantially insulated from protocol specific actions, thereby mitigating flexibility problems associated with conventional systems. The class factory 520 is then responsible for selecting a constructor, invoking a create method in the chosen constructor and returning a listener object operable to facilitate the desired exposure by the server program 510.

Thus, by moving creator selection to a class factory 520 that is external to the server program 510, flexibility and complexity problems associated with conventional systems are mitigated. Furthermore, removing such protocol specific code to the class factory 520 facilitates minimizing the computer resource requirements of the server program 510, which in turn facilitates running multiple server programs 510 on one computer.

The class factory 520 can access a data store 540 of registered protocol handlers to facilitate determining which, if any, constructor to employ to create a listener object to expose a desired resource. By way of illustration, the data store 540 of registered protocol handlers may store items including, but not limited to, a list of constructors associated with one or more URIs, a list of constructors associated with one or more URI prefixes and a list of rules for selecting a constructor based on a URI. While the previous sentence refers to lists, it is to be appreciated by one skilled in the art that the data store 540 can employ other data structures including, but not limited to, an array, a table, a database, a stack, a heap, a linked list, a heap and a data cube.

Figure 6:
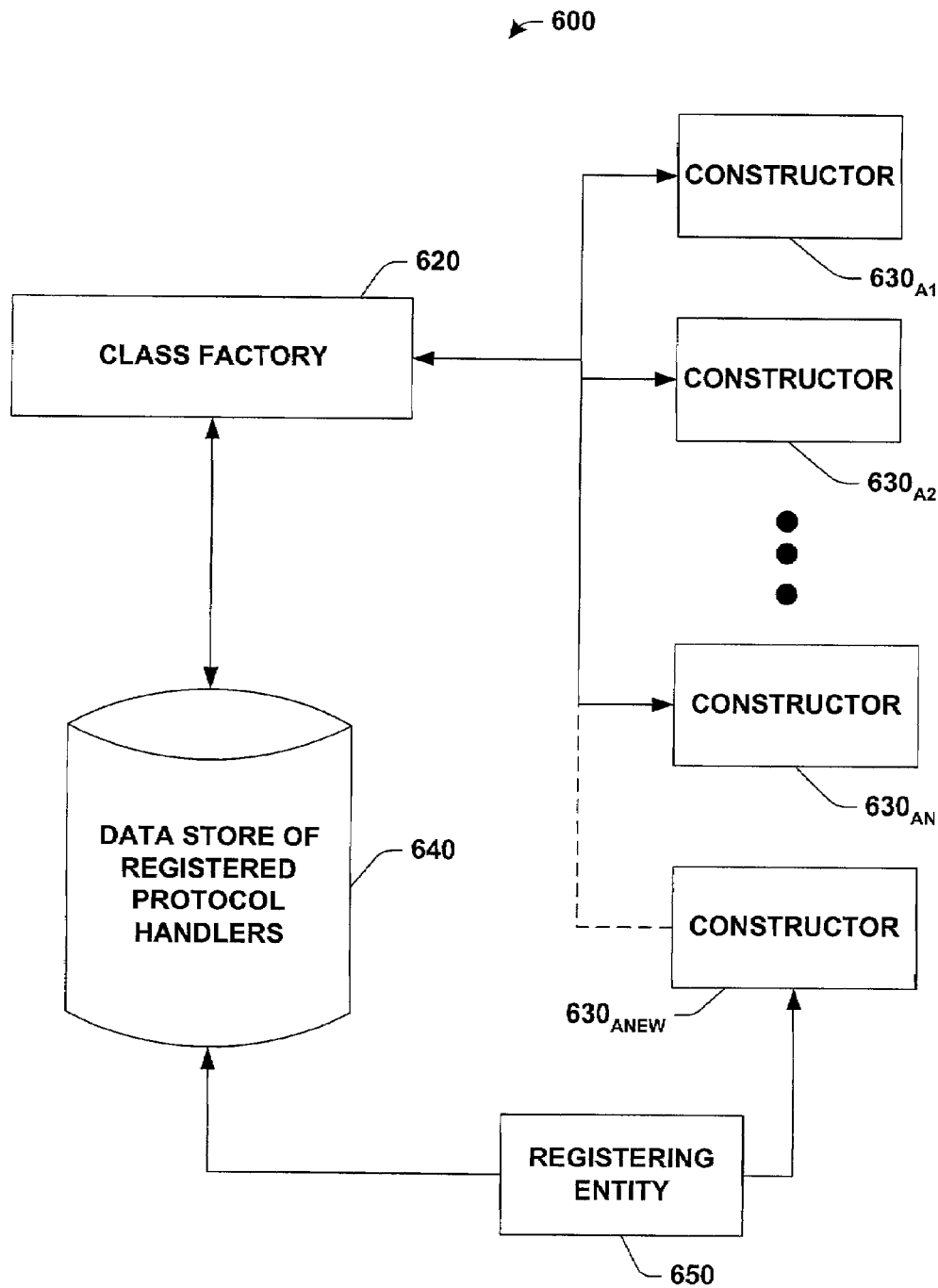
FIG. 6 is a block diagram illustrating a registering entity updating a data store of registered protocol handlers to facilitate a class factory employing a new constructor to create a new protocol object, in accordance with an aspect of the present invention.

One problem with conventional systems was the difficulty with which such systems responded to new protocols, typically requiring recoding and recompilation of server programs when new protocols were introduced. Thus, turning to FIG. 6, a system 600 for registering new listener object constructors with a class factory 620, the new listener object constructors operable to produce listener objects operable to facilitate exposing a resource via a new protocol, is illustrated. Before the addition of a new constructor $630_{ANEW}$ and related registered listener handler information, the class factory 620 had access to a first constructor $630_{A1}$, and a second constructor $630_{A2}$ through an Nth constructor $630_{AN}$, N being an integer. The first constructor $630_{A1}$ may be operable to produce listener and/or answering objects associated with a first protocol (e.g., HTTP), while the second constructor $630_{A2}$ may be operable to produce listener and/or answering objects associated with a second protocol (e.g., FTP). Information sufficient to determine which constructor, if any, is appropriate to employ to construct a listener and/or answering object to facilitate exposing a resource can be stored in a data store 640 of registered protocol handlers. The data store 640 may store items including, but not limited to, a list of constructors associated with one or more URIs, a list of constructors associated with one or more URI prefixes and a list of rules for selecting a constructor based on a URI. While the previous sentence refers to lists, it is to be appreciated by one skilled in the art that the data store 640 can employ other data structures including, but not limited to, an array, a table, a database, a stack, a heap, a linked list, a heap and a data cube.

When a registering entity 650 desires to add a new protocol to the class factory 620 set of protocols for which constructors are available, the registering entity 650 will take at least two actions. The registering entity 650 will produce a new constructor $630_{ANEW}$, and the registering entity 650 will register the new constructor $630_{ANEW}$ with the data store 640. Registering the new constructor $630_{ANEW}$ with the data store 640 may involve updating items including, but not limited to, a list of constructors associated with one or more URIs, a list of constructors associated with one or more URI prefixes and a list of rules for selecting a constructor based on a URI. While the previous sentence refers to lists, it is to be appreciated by one skilled in the art that updating the data store 640 can involve updating other data structures including, but not limited to, an array, a table, a database, a stack, a heap, a linked list, a heap and a data cube. Once the data store 640 is updated, then the class factory 620 can employ the new constructor 630$_{ANEW}$ to create protocol objects associated with the new protocol. It is to be appreciated by one skilled in the art that although a registering entity 650 is illustrated, that an adding component may be employed to add an identifier to the data store 640 of registered protocol handlers and that any suitable adding component may be employed with the present invention.

Adding a new constructor 630$_{ANEW}$ operable to produce listener and/or answering objects associated with the new protocol can thus be completed without requiring changes to a server program (e.g., 510, FIG. 5). To acquire a listener object created by the new constructor 630$_{ANEW}$, a server program (e.g., 510, FIG. 5) would not require recompilation, thus mitigating lifespan problems associated with conventional systems. A server program (e.g., 510, FIG. 5) may not even be aware that the new constructor 630$_{ANEW}$ became available. By way of illustration, acquiring a listener object operable to facilitate exposing a resource through a new protocol may involve inputting a parameter to the server program (e.g., 510, FIG. 5), and passing the parameter to existing generator code that will in turn access the class factory 620. The parameter may be a URI. To acquire a listener object created by the new constructor 630$_{ANEW}$, a server program (e.g., 510, FIG. 5) could provide a URI to the class factory, which would be responsible for determining that the new constructor 630$_{ANEW}$ was available and appropriate for the desired communication, and which would further be responsible for invoking the new constructor 630$_{ANEW}$ and returning the listener object(s) created by the new constructor 630$_{ANEW}$. The class factory 620 will be able to interact with the new constructor 630$_{ANEW}$ and a server program will be able to interact with a listener object created by the new constructor 630$_{ANEW}$ if the new constructor implements a set of methods defined in an abstract network base class. Such abstract base class enabled access to the new constructor can thus be accomplished with no changes to the server program.

Figure 7:
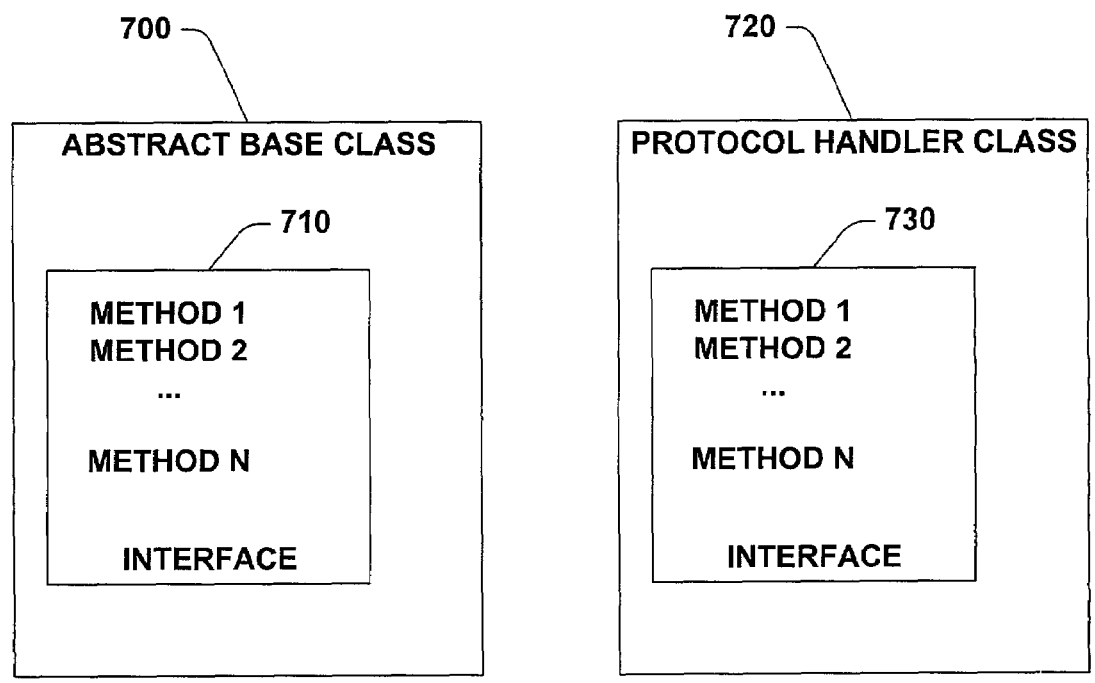
FIG. 7 is a block diagram illustrating an abstract base class and a protocol handler class, which inherits from the abstract base class, implementing the abstract base class, in accordance with an aspect of the present invention.

Thus, turning to FIG. 7, an abstract base class 700 and a protocol handler class 720 that inherits from the abstract base class 700 and which implements the abstract base class 700 are illustrated. It is to be appreciated by one skilled in the art that the protocol handler class 720 can provide the functionality of a listener object (e.g., 450, FIG. 4) and/or an answering object (e.g., 410, FIG. 4). The abstract base class 700 defines an interface 710, which includes N methods, N being an integer. The abstract base class 700 may also define one or more properties. The protocol handler class 720 inherits from the abstract base class 700, and implements the interface 710. In an abstract base class, methods are defined but not implemented. The present invention employs such abstract base classes to define an interface that protocol handler classes can implement.

The interface 710 can have methods including, but not limited to, methods for creating an object, methods for writing to a byte stream, methods for reading from a byte stream, methods for adding protocol specific information to data, methods for removing protocol specific information from data, methods for registering a protocol object creator and methods for determining the status of an exposure. It is to be appreciated by one skilled in the art that some methods may be visible to a server program interacting with a protocol handler class object 720 (e.g., write to byte stream, read to byte stream) while other methods may not be visible to such a server program (e.g., add protocol header, remove protocol header). It is to be further appreciated that some methods (e.g., creator methods) may be invoked by a class factory (e.g., 620, FIG. 6). The implementation of the interface 710 by the class specific object 720 facilitates implementing class factory functionality, with such functionality being removed from an application program, which thus mitigates server program complexity and size problems.

Figure 8:
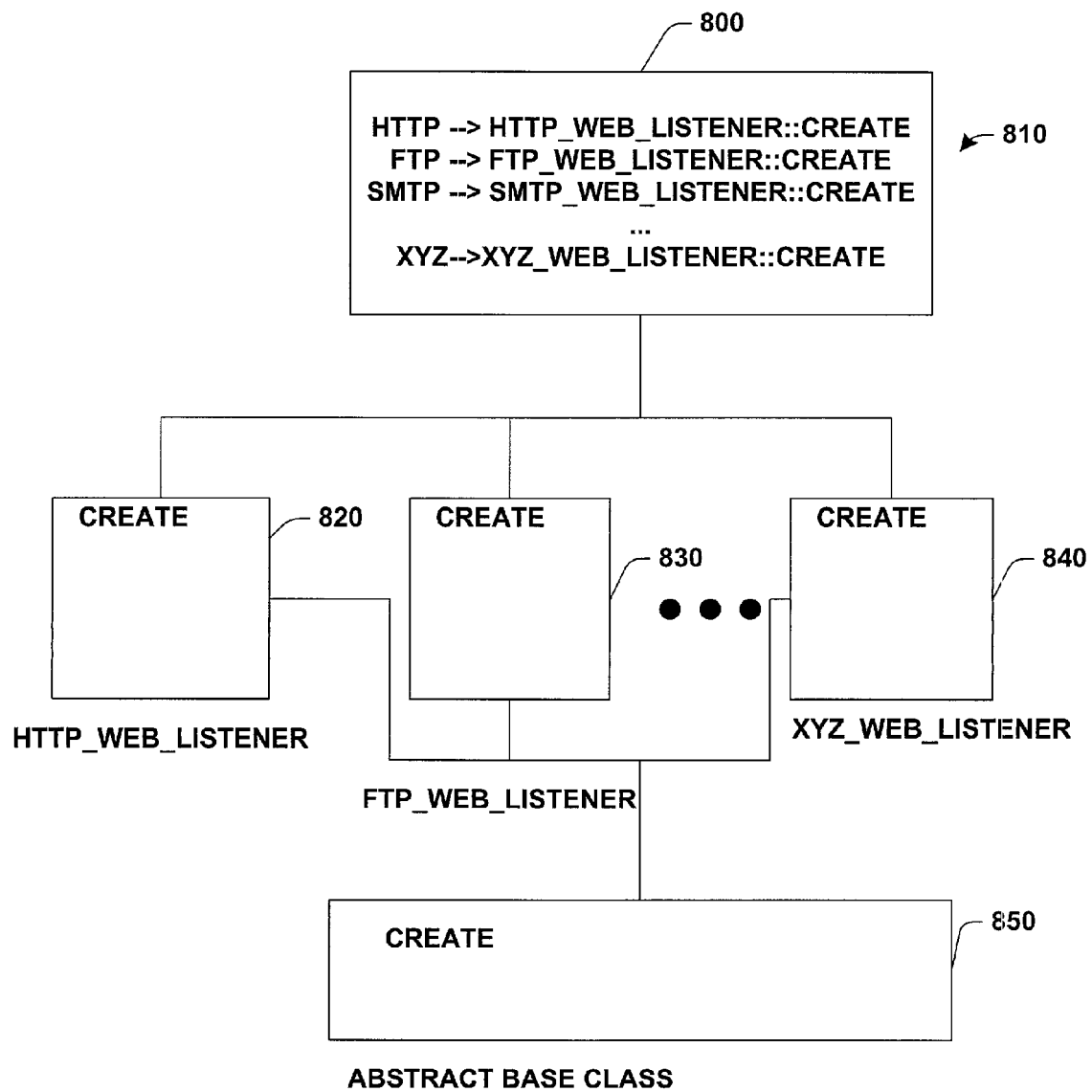
FIG. 8 is a block diagram illustrating a class factory registry of protocol object creators that have implemented an abstract base class creator, in accordance with an aspect of the present invention.

Turning to FIG. 8, a block diagram illustrates a class factory 800 with a registry 810 of protocol object creators. It is to be appreciated by one skilled in the art that although protocol object creators are discussed in connection with FIG. 8, that such protocol objects can provide the functionality of a listener object (e.g., 450, FIG. 4) and/or an answering object (e.g., 410, FIG. 4). The registry 810 of protocol object creators can include identifiers that can be employed to resolve a URI. Such identifiers may be associated with parameters that can be input to a server program (e.g., 510, FIG. 5). The registry 810 can be employed to associate identifiers with protocol object creators in protocol objects that have implemented an abstract base class creator method 850. By way of illustration, the creator method 820 may be an implementation of a base class create method 850, with the creator method 820 defined by a protocol object class associated with facilitating exposing a resource via HTTP. By way of further illustration, the creator method 830 may be an implementation of the base class create method 850, with the creator method 830 being defined by a protocol object class associated with facilitating exposing a resource via FTP.

The registry 810 can be indexed, for example, by a URI, and/or by a prefix associated with a URI. For example, the prefix "http" in a URI http://ServerX1/mymoney may be employed as an identifier in the registry 810. The identifier can be employed to locate a creator method 820 appropriate to create a listener object associated with facilitating exposing a resource via the HTTP protocol. The creator method 820 can be, for example, the HTTP_WEB_LISTENER:: CREATE method. Also, for example, the prefix "ftp" in a URI ftp://ServerX1/yourmoney may be employed as an identifier in the registry 810. The identifier can be employed to locate a creator method 830 appropriate to create a listener object associated with facilitating exposure via the FTP protocol. The creator method 830 can be, for example, the FTP_WEB_LISTENER::CREATE method.

By employing the registry 810 and the identifiers stored in the registry 810 to locate methods implementing methods defined in the abstract base class 850, the present invention facilitates adding creator methods that can be employed to create listener objects associated with new protocols, with such addition not requiring changes to a server program employing such creator methods. The registry 810 can be updated, and a new creator method can be added without requiring rewriting and/or recompilation of a server program (e.g., 510, FIG. 5), thus mitigating complexity and lifespan problems associated with conventional systems.

Figure 9:
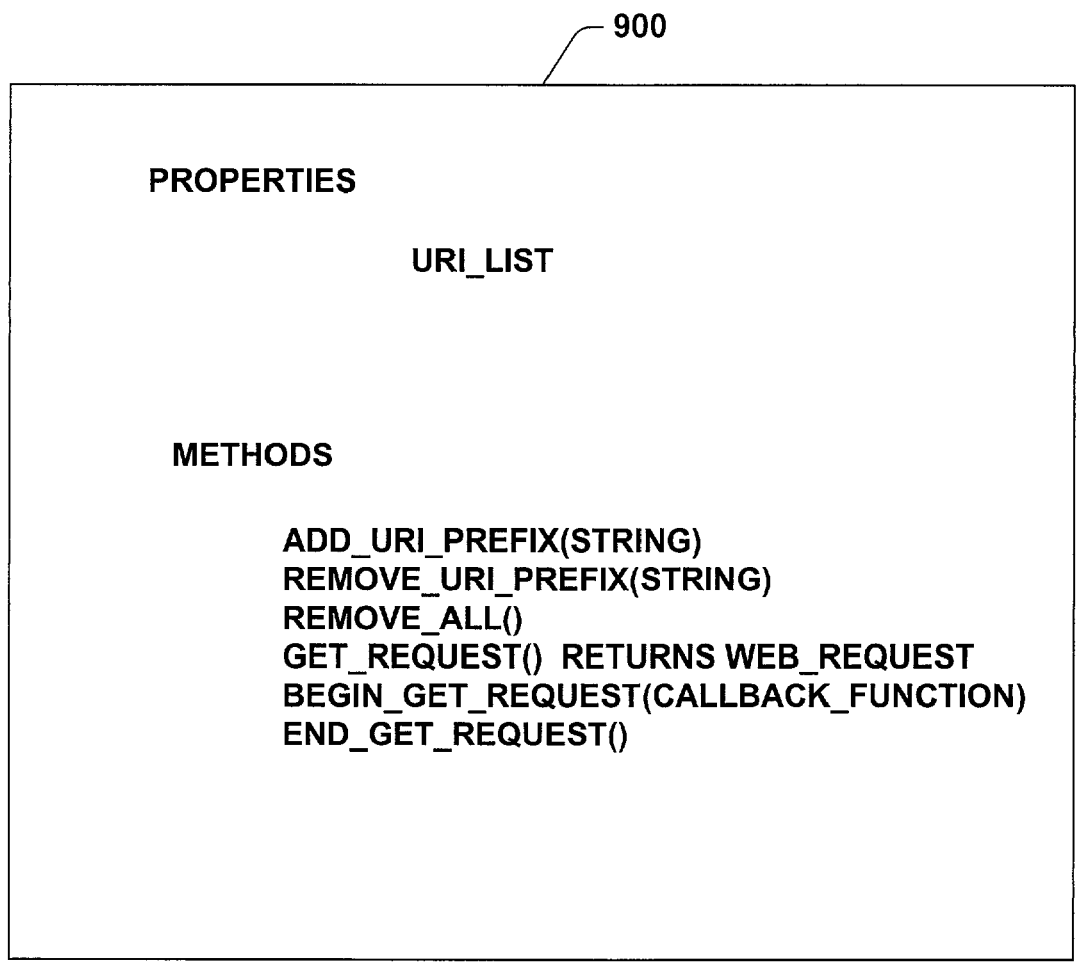
FIG. 9 illustrates an exemplary abstract base class definition for an object designed to simplify exposing resources by facilitating listening for requests from accessing applications, in accordance with an aspect of the present invention.

FIG. 9 illustrates an exemplary abstract base class definition 900 for an object designed to simplify listening for and reading data from an application accessing an exposed resource. The abstract base class can be, for example a WEB_LISTENER object, which can be cast to implementing classes, including, but not limited to, an HTTP_WEB_LISTENER object, an FTP_WEB_ LISTENER object and an SMTP_WEB_LISTENER object. The protocol specific implementing classes (e.g., HTTP_WEB_LISTENER, FTP_WEB_LISTENER and SMTP_WEB_LISTENER) can be employed to produce WebResponse objects associated with the protocol implemented by the protocol specific implementing class. For example, an HTTP_WEB_LISTENER created with WebListenerFactory.Create("HTTP") could return an Http WebRequest object that implements the generic WebRequest base class.

The base class definition 900 can include properties and methods. The properties can include, but are not limited to a URI_LIST. The methods can include, but are not limited to, an ADD_URI_PREFIX(STRING)method, a REMOVE_URI_PREFIX(STRING) method, a REMOVE_ALL( ) method, a GET_REQUEST( ) method, a BEGIN_GET_REQUEST( ) method and an END_GET_REQUEST( ) method. While one property and six methods are illustrated in FIG. 9, it is to be appreciated by one skilled in the art that a greater or lesser number of properties and/or methods can be employed in a listening/reading object in accordance with the present invention.

The URI_LIST property may hold, for example, a list of strings containing identifiers (e.g., URIs) of exposed resources registered with a listener object. Such a list may be employed to associate listener objects with entities being accessed, for example. Thus, data stored in the properties can be employed to facilitate exposing a resource to one or more accessing applications via one or more protocols by storing information employed in facilitating such exposure. Storing such information in a listener object implementing an abstract base class definition facilitates reducing server program complexity by removing such protocol specific information from a server program, thus mitigating complexity problems associated with conventional systems.

The ADD_URI_PREFIX(STRING) method can be employed, for example, to register an identifier (e.g., a URI, a URI prefix) in a class factory data store (e.g., 640, FIG. 6) to facilitate associating one or more listener objects with one or more resources. Conversely, the REMOVE_URI_ PREFIX(STRING) method can be employed, for example, to deregister an identifier (e.g., URI, prefix) in a class factory data store (e.g., 640, FIG. 6) when the listener object association is no longer valid. Similarly, the REMOVE_ALL( ) method can be employed, for example, to deregister identifiers (e.g., URIs, prefixes) in a class factory data store (e.g., 640, FIG. 6) when the listener object associations are no longer valid and/or available. The GET_REQUEST( ) method can be employed, for example, to facilitate synchronous listening. The GET_REQUEST( ) method can return an object containing a web request in a generic, protocol-free form (e.g., a WebRequest object) . . . The GET_REQUEST( ) can block until such a request is received, thus facilitating synchronous listening. The BEGIN_GET_REQUEST(CALLBACK_FUNCTION) method can perform, for example, an asynchronous listen, which does not block waiting for a request to be received by the listener object upon which the method was invoked. The END_GET_REQUEST( ) method completes, in the callback function identified in the callback function identified in the CALLBACK_FUNCTION parameter, the asynchronous listen initiated by the BEGIN_GET_REQUEST (CALLBACK_FUNCTION) method. Moving such functionality to methods implementing an abstract base class facilitates simplifying server programs and thus mitigates complexity problems associated with conventional systems.

Figure 10:
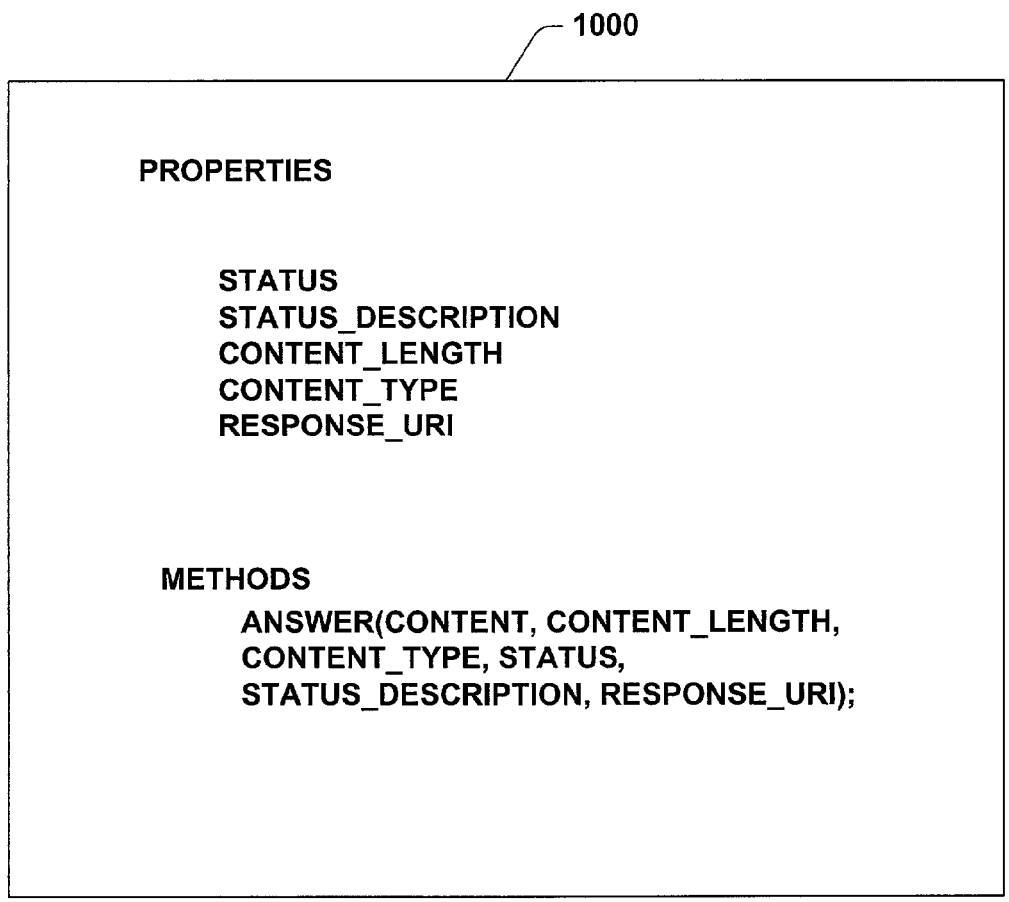
FIG. 10 illustrates an exemplary abstract base class definition for an object designed to simplify exposing resources by facilitating returning content to an accessing application, in accordance with an aspect of the present invention.

FIG. 10 illustrates an exemplary abstract base class definition 1000 for an object designed to simplify writing exposed resource data to one or more accessing applications. The abstract base class may include properties and methods. The properties can include, but are not limited to, a STATUS property, a STATUS_DESCRIPTION property, a CONTENT_LENGTH property, a CONTENT_TYPE property and a RESPONSE_URI property. The methods can include, but are not limited to, an ANSWER method.

The STATUS property may hold, for example, a status code associated with a response to a request from an accessing application (e.g., HTTP 404 error code). The STATUS_DESCRIPTION property may hold, for example, a string describing the response status code (e.g., "page not found"). The CONTENT_LENGTH property may hold, for example, the length of the data response from the exposed resource. The RESPONSE_URI property may hold, for example, a URI that was associated with the location to which the response to the request from the accessing application should be sent. The value of the RESPONSE_URI property does not have to match the URI of the accessing application, thus facilitating receiving requests from a first accessing application and returning data responsive to the request to a second accessing application. Thus, data stored in the properties can be employed to facilitate exposure of one or more resources to one or more accessing applications via one or more protocols by storing information employed in facilitating such exposure. Storing such information in properties in an answering object that implements the abstract base class facilitates reducing server program complexity by removing such protocol specific information from the server program, thus mitigating complexity problems associated with conventional systems.

The ANSWER method may, for example, return content from an exposed resource to an accessing application. The ANSWER method may employ one or more properties stored in the answering object, thus simplifying server program code. Moving such functionality to methods implementing an abstract base class definition facilitates simplifying server programs and thus mitigates complexity problems associated with conventional systems.

Figure 11:
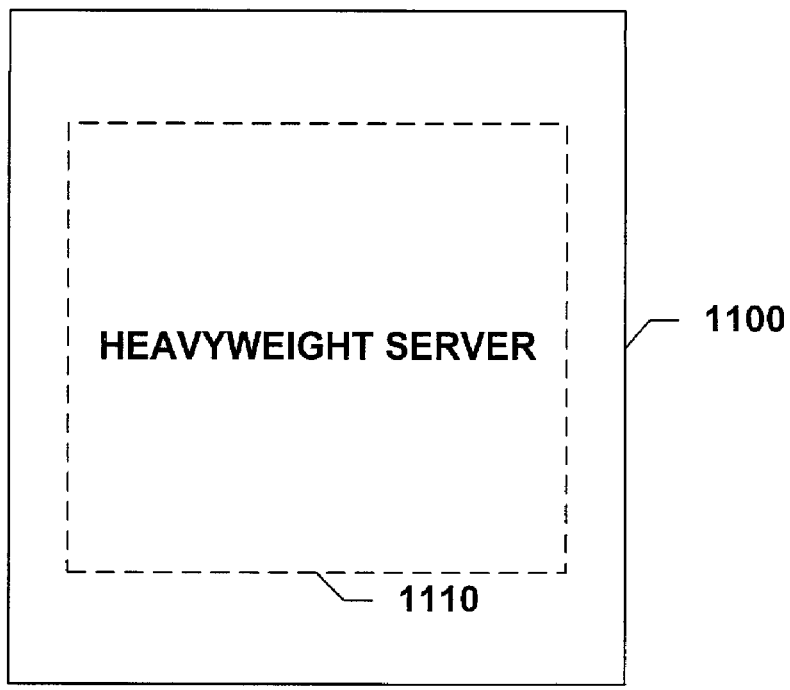
FIG. 11 is a block diagram comparing and contrasting a protocol-centric server with a number of lightweight servers, in accordance with an aspect of the present invention.
Figure 11:
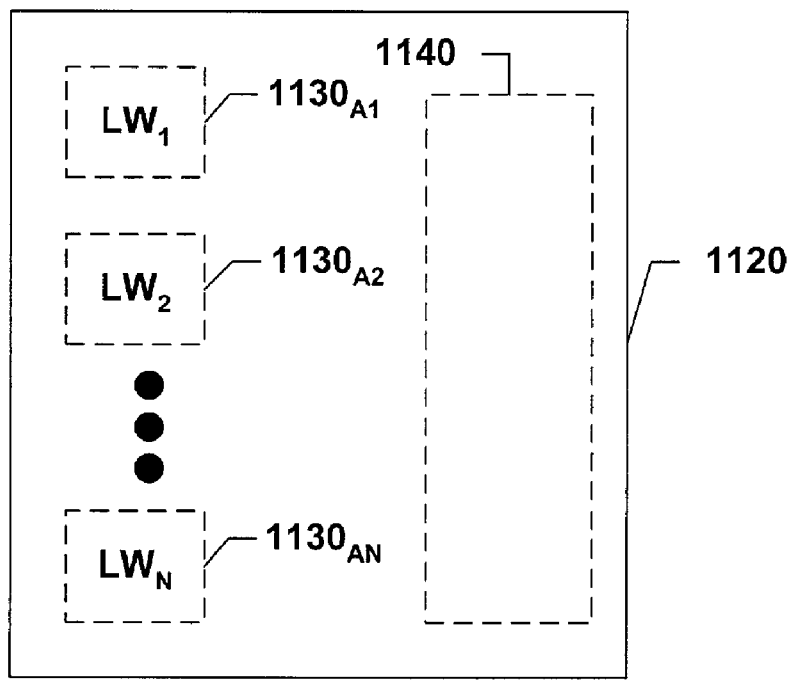

Turning now to FIG. 11, a block diagram compares and contrasts a protocol-centric server program 1110 running on a first server 1100 with a number of lightweight servers 1130$_{A1}$, 1130$_{A2}$ through 1130$_{AN}$, N being an integer, running on a second server 1120. A typical protocol-centric server 1110 consumes substantially all of the namespace of the server 1100 on which it runs. Similarly, a typical protocol-centric server 1110 may function optimally if it is the only server program running on the server 1100. Thus, conventional systems may be limited to exposing one resources or one set of resources, all of which interact with the protocol-centric server 1110. Furthermore, the protocol-centric server 1110 may consume substantially all of the computer resources available for network communications on the server 100. Thus, conventional protocol-centric systems may not be suitable for creating ad hoc peer-to-peer networks.

The lightweight servers 1130$_{A1}$, 1130$_{A2}$ through 1130$_{AN}$, N being an integer, running on the second server 1120 may not consume substantially all of the namespace of the server 1120 on which they run. Thus, more than one lightweight server may be able to operate concurrently on the server 1120. Such concurrent operation can facilitate the creation of ad hoc peer-to-peer networks. Furthermore, a lightweight server 1130$_{A1}$ may not consume substantially all of the computer resources available on the server 1120 for network communications. Thus, additional resources 1140 may be available for network communications facilitating the concurrent operation of other lightweight servers (e.g., 1130$_{A2}$ through 1130$_{AN}$). Again, such concurrent operation can facilitate the creation of ad hoc peer-to-peer networks. Another advantage of such concurrent operation is the ability to concurrently expose one or more resources to one or more accessing applications via one or more protocols, with different resources interacting with different lightweight servers.

Figure 12:
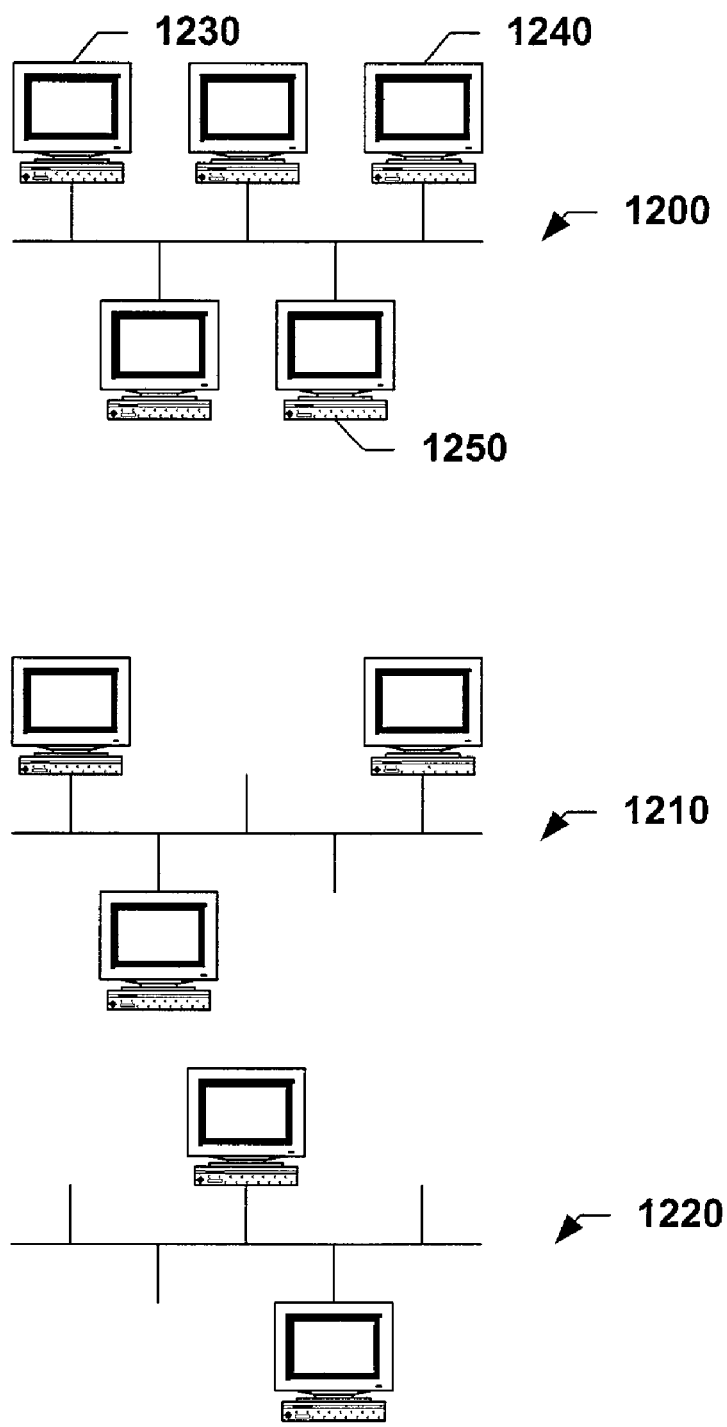
FIG. 12 illustrates peer-to-peer networks being formed and reformed on an ad hoc basis, as facilitated by an aspect of the present invention.

FIG. 12 illustrates peer-to-peer networks being formed and reformed on an ad hoc basis. A first peer-to-peer network 1200 may be created between five users, while a second peer-to-peer network 1210 may only include three of the five users of the first network 1200. Similarly, a third peer-to-peer network 1220 may be created between two of the three users of the first network 1200. The present invention facilitates a user in a peer-to-peer network functioning as either and/or both of a resource exposure and a resource accessor. For example, a first user 1230 may expose a resource that a second user 1240 and a third user 1250 access. Simultaneously, the first user 1230 may access a resource exposed by the third user 1250. Thus, the present invention facilitates holding bi-directional conversations between users on peer-to-peer networks, without limiting a user to being only a consumer or a server, thus mitigating conversation directional limitation problems associated with conventional systems. The ability to act as both a server and a consumer is facilitated by removing protocol specific code to listener objects and to the resulting decrease in computer resources required by a server program employing the objects provided by the present invention.

Figure 13:
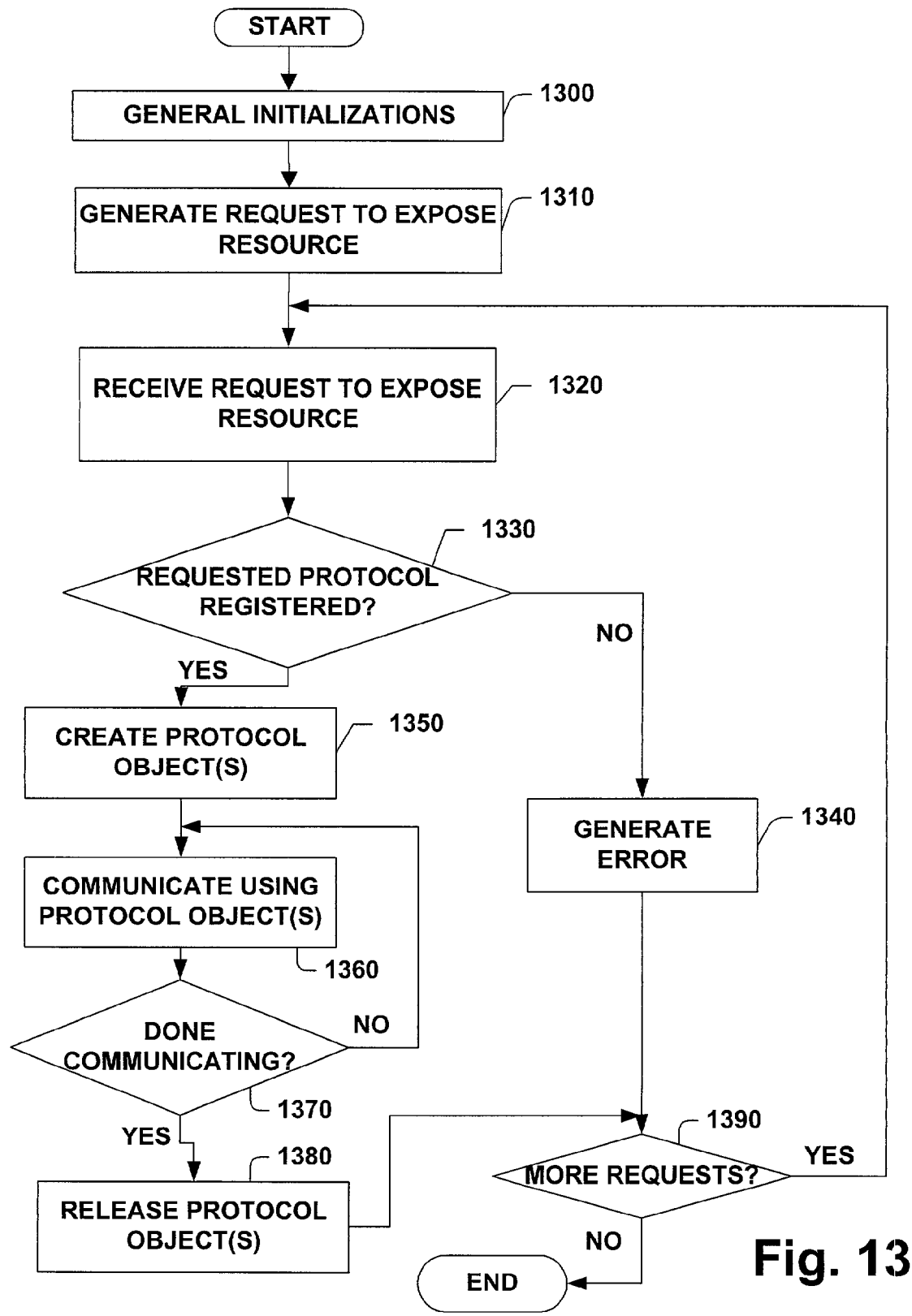
FIG. 13 is a flow chart illustrating an example methodology for practicing an aspect of the present invention.

In view of the exemplary systems shown and described above, methodologies, which may be implemented in accordance with the present invention, will be better appreciated with reference to the flow diagram of FIG. 13. While for purposes of simplicity of explanation, the methodology of FIG. 13 is shown and described as a series of blocks representative of acts and/or events in accordance with the present invention, it is to be understood and appreciated that the present invention is not limited by the order and/or number of blocks, as some blocks may, in accordance with the present invention, occur in different orders and/or concurrently with other blocks from that shown and described herein. Moreover, not all illustrated blocks may be required to implement a methodology in accordance with the present invention.

FIG. 13 is a flow chart illustrating a method for exposing resources. At 1300, general initializations occur. Such initializations include, but are not limited to, allocating memory, establishing pointers, establishing data communications, acquiring resources, setting variables and displaying process activity. At 1310, a server program generates a request to expose a resource. The request of 1310 may include an identifier that can be employed to resolve which, if any, constructor will be employed to create a protocol object to facilitate the desired exposure. The protocol objects can include listener and/or answering objects. A protocol object may function as both a listener and an answering object. At 1320, the expose resource request of 1310 is received, and an identifier associated with the request may be examined. At 1330, a determination is made concerning whether a protocol through which the desired exposure can be made has been registered. If the determination at 1330 is NO, then at 1340 an error message can be generated and returned to the server program requesting the exposure. If the determination at 1330 is YES, then at 1350, one or more protocol objects can be created, the protocol objects being operable to facilitate the desired exposure. By way of illustration, if the request of 1310 desired to expose an HTML resource, then a protocol object operable to facilitate exposure over an HTTP protocol may be created. The determination of 1330 may be based, at least in part, on a URI and/or portion of a URI (e.g., prefix) associated with the request of 1310.

At 1360, the requested exposure can be undertaken, such exposure facilitated by employing the protocol object(s) created at 1350. At 1370 a determination is made concerning whether the requested exposure is complete. If the determination at 1360 is NO, then processing can proceed at 1360. If the determination at 1360 is YES, then at 1380 the protocol object(s) created at 1350 may be released (e.g., deallocated, destructed). At 1390 a determination is made concerning whether there are any more requests to expose resources. If the determination at 1390 is YES, then processing continues at 1320. If the determination at 1390 is NO, then processing concludes.

Figure 14:
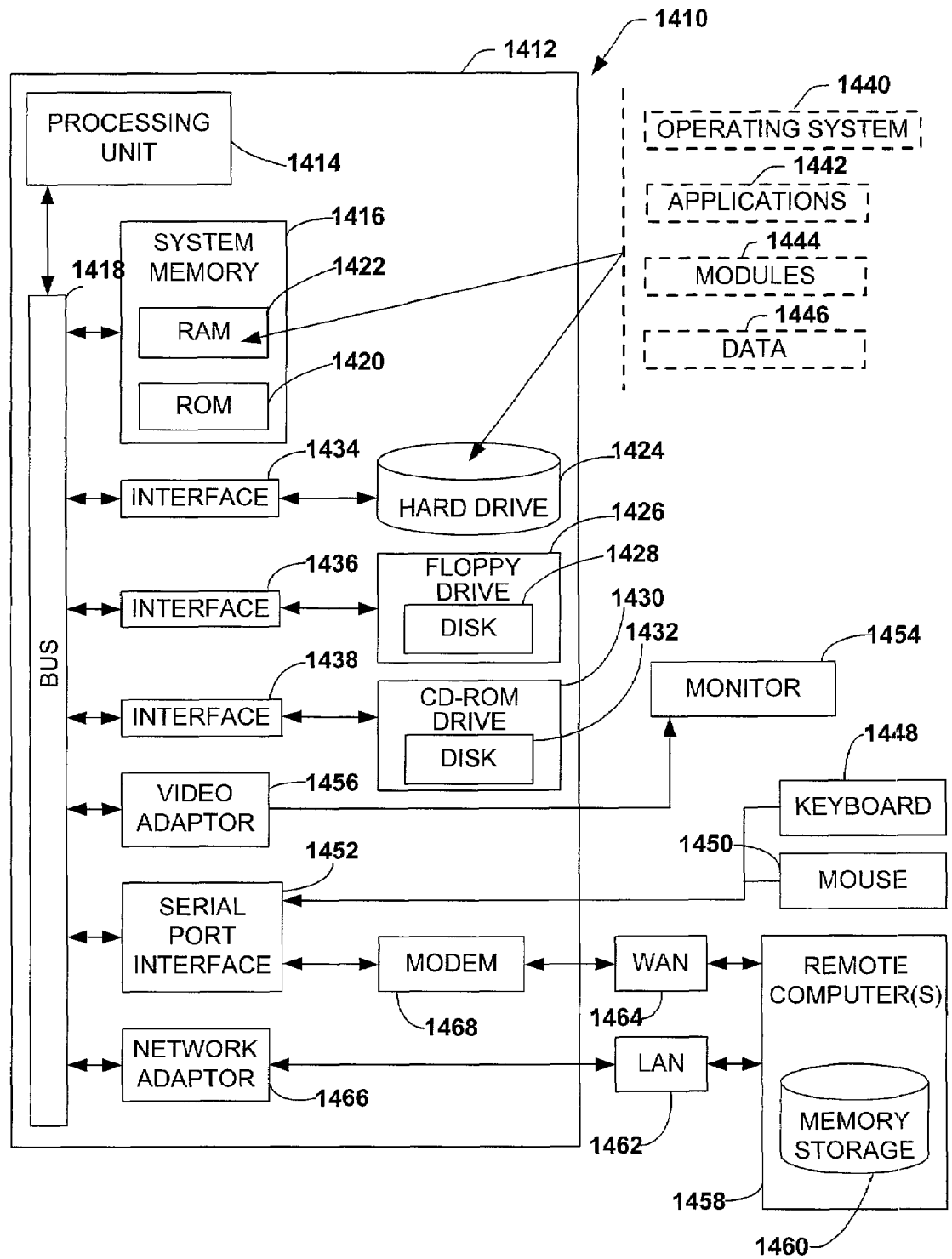
FIG. 14 is a schematic block diagram of an exemplary operating environment for a system configured in accordance with the present invention.

FIG. 14 is a schematic block diagram of an exemplary operating environment for a system configured in accordance with the present invention. In order to provide additional context for various aspects of the present invention, FIG. 14 and the following discussion are intended to provide a brief, general description of a suitable computing environment 1410 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software. Generally, program modules include routines, programs, components, data structures, etc. that perform particular tasks or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

With reference to FIG. 14, an exemplary environment 1410 for implementing various aspects of the invention includes a computer 1412, the computer 1412 including a processing unit 1414, a system memory 1416 and a system bus 1418. The system bus 1418 couples system components including, but not limited to, the system memory 1416 to the processing unit 1414. The processing unit 1414 may be any of various commercially available processors. Dual microprocessors and other multi-processor architectures also can be employed as the processing unit 1414.

The system bus 1418 can be any of several types of bus structure including a memory bus or memory controller, a peripheral bus and a local bus using any of a variety of commercially available bus architectures. The system memory 1422 includes read only memory (ROM) 1420 and random access memory (RAM) 1422. A basic input/output system (BIOS), containing the basic routines that help to transfer information between elements within the computer 1412, such as during start-up, is stored in ROM 1420. The computer 1412 further includes a hard disk drive 1424, a magnetic disk drive 1426, (e.g., to read from or write to a removable disk 1428) and an optical disk drive 1430, (e.g.

for reading a CD-ROM disk 1432 or to read from or write to other optical media). The hard disk drive 1424, magnetic disk drive 1426 and optical disk drive 1430 can be connected to the system bus 1418 by a hard disk drive interface 1434, a magnetic disk drive interface 1436 and an optical drive interface 1438, respectively. The drives and their associated computer-readable media provide nonvolatile storage of data, data structures, computer-executable instructions, etc. for the computer 1412, including for the storage of broadcast programming in a suitable digital format. Although the description of computer-readable media above refers to a hard disk, a removable magnetic disk and a CD, it should be appreciated by those skilled in the art that other types of media which are readable by a computer, such as zip drives, magnetic cassettes, flash memory cards, digital video disks, cartridges, and the like, may also be used in the exemplary operating environment, and further that any such media may contain computer-executable instructions for performing the methods of the present invention.

A number of program modules can be stored in the drives and RAM 1422, including an operating system 1440, one or more application programs 1442, other program modules 1444 and program data 1446. It is to be appreciated that the present invention can be implemented with various commercially available operating systems or combinations of operating systems.

A user can enter commands and information into the computer 1412 through a keyboard 1448 and a pointing device, such as a mouse 1450. Other input devices (not shown) may include a microphone, an IR remote control, a joystick, a game pad, a satellite dish, cameras, in the sense of gesture interpreted through cameras and machine-vision software, a scanner, or the like. These and other input devices are often connected to the processing unit 1414 through a serial port interface 1452 that is coupled to the system bus 1418, but may be connected by other interfaces, such as a parallel port, a game port, a universal serial bus ("USB"), an IR interface, etc. A monitor 1454 or other type of display device is also connected to the system bus 1418 via an interface, such as a video adapter 1456. In addition to the monitor, a computer typically includes other peripheral output devices (not shown), such as speakers, printers etc.

The computer 1412 may operate in a networked environment using logical connections to one or more remote computers, such as a remote computer(s) 1458. The remote computer(s) 1458 may be a workstation, a server computer, a router, a personal computer, microprocessor based entertainment appliance, a peer device or other common network node, and typically includes many or all of the elements described relative to the computer 1412, although, for purposes of brevity, only a memory storage device 1460 is illustrated. The logical connections depicted include a local area network (LAN) 1462 and a wide area network (WAN) 1464. Such networking environments are commonplace in offices, enterprise-wide computer networks, intranets and the Internet.

When used in a LAN networking environment, the computer 1412 is connected to the local network 1462 through a network interface or adapter 1466. When used in a WAN networking environment, the computer 1412 typically includes a modem 1468, or is connected to a communications server on the LAN, or has other means for establishing communications over the WAN 1464, such as the Internet. The modem 1468, which may be internal or external, is connected to the system bus 1418 via the serial port interface 1452. In a networked environment, program modules depicted relative to the computer 1412, or portions thereof, may be stored in the remote memory storage device 1460. It will be appreciated that the network connections shown are exemplary and other means of establishing a communications link between the computers may be used.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising", as comprising is interpreted as a transitional word in a claim.

What is claimed is:

1. A system for communicating over a protocol, comprising:
   a content associated with a Uniform Resource Identifier (URI) to be exposed;
   a class factory comprising a plurality of identifiers and associated registered listener object creators, at least one of the listener object creators adapted to create at least one listener object that facilitates exposure of the URI;
   a reading component that reads a first data from an accessing application, the first data having at least one of, a format specific to the protocol and one or more headers and/or footers specific to the protocol, when the first data is read from the accessing application, the first data requesting access to a second data;
   an exposing component that exposes the second data, the second data being associated with a URI; and
   a writing component that writes a third data to the accessing application, the third data having at least one of, a format specific to the protocol and one or more headers and/or footers specific to the protocol, when the third data is written to the accessing application, the third data being derived, at least in part, from the second data.

2. The system of claim 1, comprising:
   an exposing component that exposes a resource to access by one or more accessing applications.

3. The system of claim 2, wherein the resource is at least one of, a service, an application and a content source, and the resource is accessible over a network.

4. The system of claim 3, wherein the protocol is at least one of a Hypertext Transfer Protocol (HTTP), a File Transfer Protocol (FTP) and a Simple Mail Transport Protocol (SMTP).

5. The system of claim 4, wherein the plurality of identifiers comprise one or more URIs.

6. The system of claim 4, wherein the plurality of identifiers comprise one or more prefixes associated with one or more URIs.

7. The system of claim 1, wherein at least one of the listener object creators instantiates at least one listener object, with at least one of the listener object creators being software in execution.

8. The system of claim 7, wherein the at least one of the listener object creators registers one or more implemented creating methods with the class factory, the creating methods being defined in an abstract base class and implemented by the at least one listener object.

9. The system of claim 8, wherein the at least one listener object inherits from one or more abstract base classes.

10. The system of claim 1, wherein the at least one listener object is adapted to listen for the first data from the accessing application.

11. The system of claim 10, wherein the at least one listener object makes the first data received from the accessing application available as a byte stream to a server program.

12. The system of claim 11, wherein the at least one listener object removes at least one of a format specific to the protocol and one or more headers and/or footers specific to the protocol from the first data.

13. The system of claim 12, further comprising:
one or more protocol objects adapted to write the third data to the accessing application.

14. The system of claim 13, wherein the at least one protocol object accepts a byte stream to write as the third data to the accessing application.

15. The system of claim 14, wherein the at least one protocol object adds at least one of a format specific to the protocol and one or more headers and/or footers specific to the protocol to the third data.

16. The system of claim 1, comprising:
an adding component adapted to add one or more identifiers to a list of registered identifiers, and further adapted to add one or more listener object creating methods to a list of registered listener object creating methods.

17. The system of claim 1, wherein the at least one listener object and one or more answering objects reside on a single server machine, the at least one listener object and the one or more answering objects operable to expose one or more applications, services and/or content sources to one or more accessing applications.

18. A method for communication over a protocol, comprising:
utilizing a component to read a first data from an accessing application, the first data having a format specific to a protocol;
requesting access to a second data when the first data is read from the accessing application, the second data associated with a Universal Resource Identifier (URI);
exposing the second data;
deriving a third data, at least in part, from the second data, the third data having a format specific to a protocol; and
writing the third data to the accessing application.

19. The method of claim 18, associating content with a URI.

20. The method of claim 18, utilizing a class factory comprising one or more identifiers and associated registered listener object creators.

21. The method of claim 20, adapting at least one of the listener object creators to create at least one listener object.

22. The method of claim 18, facilitating exposure of the URI through at least one listener object.

23. The method of claim 18, the first data having one or more headers and/or footers specific to the protocol.

24. The method of claim 18, the third data having one or more headers and/or footers specific to the protocol.

25. The method of claim 18, exposing a resource to access by one or more accessing applications, the resource is at least one of, a service, an application and a content source.

26. The method of claim 25, accessing the resource over a network.

27. The method of claim 18, the protocol is at least one of a Hypertext Transfer Protocol (HTTP), a File Transfer Protocol (FTP) and a Simple Mail Transfer Protocol (SMTP).

28. The method of claim 18, a plurality of identifiers comprise one or more URIs.

29. The method of claim 18, associating one or more identifiers with one or more URIs.

30. The method of claim 29, the one or more identifiers comprise one or more prefixes.

31. A system for communicating over a protocol, comprising:
a first component comprising one or more identifiers and object creators, one or more of the object creators instantiating on a single server machine at least one listener object and at least one answering object, the at least one listener object and the at least one answering object exposing resources to one or more accessing applications.

32. The system of claim 31, the resources linked to one or more Universal Resource Identifier (URI).

33. The system of claim 31, the resources comprising a plurality of applications, services and/or content.

34. The system of claim 31, at least one listener object utilizing a network to expose resources.

35. The system of claim 31, at least one answering object employing a network to expose resources.

36. The system of claim 31, at least one listener object and at least one answering object inherits from one or more abstract base classes.

37. The system of claim 31, at least one listener object listens for a first data from an accessing application.

38. The system of claim 31, at least one listener object makes a first data received from an accessing application available as a byte stream to a server program.

39. The system of claim 31, at least one answering object employs a data stream to communicate with an accessing application.

40. The system of claim 31, further comprising a second component to read a first data from an accessing application, the first data comprising at least one protocol specific format and at least one protocol specific header and/or footer.

41. The system of claim 40, the first data from the accessing application requesting access to a second data.

42. The system of claim 41, the second data comprising resources associated with a Universal Resource Identifier (URI).

43. The system of claim 41, further comprising a third component to write a third data to an accessing application.

44. The system of claim 43, the third data comprising at least one protocol specific format and at least one protocol specific header and/or footer.

45. The system of claim 31, the protocol is at least one of a Hypertext Transfer Protocol (HTTP), a File Transfer Protocol (FTP) and a Simple Mail Transport Protocol (SMTP).

46. A system for communicating over a protocol, comprising:
means for reading a first data from an accessing program, the first data conforming to a format specific protocol;
means for accessing a second data when the first data is read, the second data linked to one or more Universal Resource Identifier (URI);
means for deriving a third data, at least in part, from the second data, the third data complying with the format specific protocol; and means for writing the third data to the accessing application.

47. A system for communication over a protocol, comprising:
means for instantiating at least one or more receiving objects and at least one or more responding objects on a server machine; and
means for exposing resources associated with at least one Universal Resource Identifier (URI) via the at least one or more receiving objects and the at least one or more responding objects to at least one accessing application.

* * * * *

UNITED STATES PATENT AND TRADEMARK OFFICE
CERTIFICATE OF CORRECTION

PATENT NO. : 6,931,647 B1  
APPLICATION NO. : 09/818448  
DATED : August 16, 2005  
INVENTOR(S) : Firth et al.

Page 1 of 1

It is certified that error appears in the above-identified patent and that said Letters Patent is hereby corrected as shown below:

| COLUMN | LINE | ERROR |
|---|---|---|
| 22 | 49 | In Claim 43, delete "claim 41" and insert -- claim 31 --, therefor. |

Signed and Sealed this

Seventh Day of July, 2009

JOHN DOLL  
*Acting Director of the United States Patent and Trademark Office*